US009483204B2

(12) United States Patent
Schnapp et al.

(10) Patent No.: US 9,483,204 B2
(45) Date of Patent: Nov. 1, 2016

(54) METHOD AND APPARATUS FOR PERFORMING VOLUME REPLICATION USING UNIFIED ARCHITECTURE

(71) Applicant: Infortrend Technology, Inc., New Taipei (TW)

(72) Inventors: Michael Gordon Schnapp, New Taipei (TW); Ching-Hua Fang, Taipei (TW)

(73) Assignee: INFORTREND TECHNOLOGY, INC., New Taipei (TW)

(*) Notice: Subject to any disclaimer, the term of this patent is extended or adjusted under 35 U.S.C. 154(b) by 356 days.

(21) Appl. No.: 14/141,604

(22) Filed: Dec. 27, 2013

(65) Prior Publication Data

US 2014/0115287 A1 Apr. 24, 2014

Related U.S. Application Data

(62) Division of application No. 12/691,807, filed on Jan. 22, 2010, now Pat. No. 8,645,648.

(60) Provisional application No. 61/146,654, filed on Jan. 23, 2009.

(51) Int. Cl.
*G06F 3/06* (2006.01)
*G06F 11/20* (2006.01)

(52) U.S. Cl.
CPC .............. *G06F 3/065* (2013.01); *G06F 3/067* (2013.01); *G06F 3/0619* (2013.01); *G06F 11/2082* (2013.01); *G06F 11/2071* (2013.01)

(58) Field of Classification Search
None
See application file for complete search history.

(56) References Cited

U.S. PATENT DOCUMENTS

| 6,742,138 | B1 | 5/2004 | Gagne et al. |
| 6,907,507 | B1 | 6/2005 | Kiselev et al. |
| 2003/0177306 | A1 | 9/2003 | Cochran et al. |
| 2004/0103254 | A1* | 5/2004 | Satoyama ............ G06F 3/0613 711/150 |
| 2004/0260873 | A1 | 12/2004 | Watanabe |
| 2005/0228832 | A1* | 10/2005 | Ghotge .............. G06F 11/0727 |
| 2006/0206678 | A1 | 9/2006 | Miki |
| 2007/0022266 | A1 | 1/2007 | Takahashi et al. |
| 2008/0034176 | A1 | 2/2008 | Akutsu et al. |
| 2008/0282049 | A1 | 11/2008 | Kawamura et al. |
| 2009/0077328 | A1* | 3/2009 | Arakawa ................ G06F 1/206 711/154 |

* cited by examiner

*Primary Examiner* — Michael Alsip
*Assistant Examiner* — Ralph A Verderamo, III
(74) *Attorney, Agent, or Firm* — McClure, Qualey & Rodack, LLP

(57) ABSTRACT

Method and apparatus for performing volume replication using a unified architecture are provided. Each volume has an exclusive volume log table (VLT) and an exclusive volume block update table (VBUT). The VLT is mainly used for recording the relationship between two volumes of a mirroring pair, and the VBUT is used for tracking the state of each data block of the volume itself. By means of the cross operations and applications between the VLT and the VBUT, various volume replication processes such as volume copying and volume mirroring can be enabled under a unified architecture. For each volume, different replication relationships with other volumes can be handled merely by administering its two exclusive tables. The method and the apparatus provided by the present invention can simplify the architecture for synchronization replication and reduce the burdens of administrating tables, thereby making the operation of a storage system more efficient.

28 Claims, 22 Drawing Sheets

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 0 | 1 | 0 | 0 | 2 | 0 | 0 | 0 | 0 | 0 | 0 | 0 | 0 | 0 | 0 | 0 |
| 10 | 0 | 0 | 1 | 0 | 0 | 0 | 2 | 0 | 0 | 0 | 0 | 0 | 0 | 0 | 0 | 0 |
| 20 | 0 | 0 | 0 | 0 | 0 | 1 | 0 | 0 | 2 | 0 | 0 | 0 | 0 | 0 | 2 | 0 |
| 30 | 0 | 2 | 0 | 0 | 0 | 0 | 0 | 0 | 0 | 0 | 1 | 0 | 0 | 0 | 0 | 0 |

FIG. 11A

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 2 | 1 | 1 | 2 | 1 | 1 | 1 | 1 | 2 | 1 | 1 | 1 | 1 | 2 | 1 | 1 |
| 10 | 1 | 1 | 1 | 1 | 2 | 1 | 2 | 1 | 1 | 1 | 1 | 2 | 1 | 1 | 1 | 1 |
| 20 | 1 | 2 | 1 | 1 | 2 | 1 | 1 | 1 | 2 | 1 | 1 | 1 | 1 | 2 | 1 | 2 |
| 30 | 1 | 1 | 2 | 1 | 1 | 2 | 1 | 1 | 1 | 1 | 2 | 1 | 2 | 1 | 1 | 1 |

FIG. 11B

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 1 | 1 | 1 | 1 | 2 | 1 | 1 | 1 | 1 | 1 | 2 | 1 | 0 | 0 | 0 | 2 |
| 10 | 0 | 0 | 0 | 0 | 0 | 0 | 1 | 2 | 0 | 0 | 0 | 0 | 0 | 0 | 0 | 0 |
| 20 | 0 | 0 | 0 | 0 | 0 | 0 | 0 | 0 | 1 | 2 | 0 | 0 | 0 | 0 | 1 | 0 |
| 30 | 0 | 1 | 0 | 0 | 2 | 0 | 0 | 0 | 0 | 0 | 0 | 0 | 0 | 0 | 0 | 0 |

FIG. 11C

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 1 | 1 | 1 | 1 | 1 | 1 | 1 | 1 | 1 | 1 | 1 | 1 | 1 | 1 | 1 | 1 |
| 10 | 1 | 1 | 1 | 1 | 1 | 1 | 1 | 1 | 1 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 | 0 | 0 | 0 |

FIG. 11D

| SeqNum (31) | OpCod (32) | AltVolID (33) | AltVolSN or NxtSynBlk (34) |
|---|---|---|---|
| 1 | SYNDST | VolA | 27 |
| 2 | SYNSPL | VolA | 2 |

FIG. 12C

| SeqNum (31) | OpCod (32) | AltVolID (33) | AltVolSN or NxtSynBlk (34) |
|---|---|---|---|
| 1 | SYNDST | VolB | -1 |
| 2 | SYNSPL | VolB | 3 |

FIG. 12D

| SeqNum (31) | OpCod (32) | AltVolID (33) | AltVolSN or NxtSynBlk (34) |
|---|---|---|---|
| 1 | SYNDST | VolA | #### |

FIG. 12E

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 0 | 1 | 0 | 0 | 2 | 0 | 0 | 0 | 2 | 0 | 0 | 0 | 0 | 0 | 2 | 0 |
| 10 | 2 | 0 | 1 | 0 | 0 | 0 | 2 | 0 | 0 | 0 | 0 | 2 | 0 | 0 | 0 | 0 |
| 20 | 0 | 0 | 2 | 0 | 0 | 1 | 0 | 0 | 2 | 0 | 0 | 0 | 2 | 2 | 2 |   |
| 30 | 0 | 2 | 0 | 0 | 0 | 0 | 2 | 0 | 0 | 0 | 1 | 0 | 2 | 0 | 0 | 0 |

FIG. 13A

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 4 | 4 | 1 | 4 | 4 | 1 | 1 | 1 | 4 | 1 | 4 | 1 | 1 | 4 | 4 | 1 |
| 10 | 4 | 1 | 4 | 1 | 4 | 1 | 4 | 1 | 1 | 4 | 1 | 2 | 1 | 1 | 1 | 1 |
| 20 | 1 | 2 | 1 | 1 | 2 | 1 | 1 | 1 | 2 | 1 | 1 | 2 | 1 | 2 | 1 | 2 |
| 30 | 1 | 1 | 2 | 1 | 1 | 2 | 2 | 1 | 1 | 1 | 2 | 1 | 2 | 2 | 1 | 1 |

FIG. 13B

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 1 | 1 | 1 | 1 | 2 | 1 | 1 | 1 | 1 | 2 | 2 | 1 | 1 | 1 | 1 | 2 |
| 10 | 1 | 1 | 2 | 1 | 1 | 1 | 1 | 2 | 1 | 1 | 1 | 1 | 1 | 1 | 1 | 1 |
| 20 | 1 | 1 | 1 | 1 | 2 | 1 | 1 | 0 | 1 | 2 | 1 | 2 | 0 | 1 | 1 | 1 |
| 30 | 0 | 1 | 0 | 0 | 2 | 0 | 1 | 0 | 0 | 0 | 0 | 0 | 1 | 0 | 0 | 0 |

FIG. 13C

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0  | 1 | 1 | 2 | 1 | 1 | 1 | 2 | 1 | 1 | 1 | 1 | 1 | 1 | 1 | 2 | 1 |
| 10 | 1 | 1 | 2 | 1 | 1 | 1 | 1 | 1 | 1 | 1 | 1 | 2 | 1 | 2 | 1 | 1 |
| 20 | 1 | 1 | 1 | 2 | 1 | 2 | 1 | 1 | 2 | 1 | 2 | 1 | 1 | 1 | 1 | 1 |
| 30 | 2 | 1 | 1 | 1 | 1 | 1 | 2 | 1 | 2 | 1 | 1 | 2 | 1 | 2 | 1 | 1 |

FIG. 13D

METHOD AND APPARATUS FOR PERFORMING VOLUME REPLICATION USING UNIFIED ARCHITECTURE

CROSS REFERENCE TO RELATED APPLICATION(S)

This application is a Divisional of U.S. patent application Ser. No. 12/691,807, filed on Jan. 22, 2010, which claims the benefit of provisional Application No. 61/146,654, filed on Jan. 23, 2009, the entirety of which are incorporated by reference herein.

BACKGROUND

1. Field of Invention

The present invention relates to a method and an apparatus for performing volume replication. More particularly, the present invention relates to a method and an apparatus for performing volume copying and volume mirroring using a unified architecture.

2. Description of Related Art

In the modern societies, storage devices have been widely used in various computer systems or storage systems. According to storage purposes, some storage devices are used for storing the data needing to be constantly accessed while a storage system is operated. Such storage devices are referred to as primary storage devices. Another kind of storage devices is used for storing the backup data existing in the primary storage device, and is referred to as a secondary storage device which can replace the primary storage device to maintain normal system operations when the primary storage device fails or breaks down, thereby enhancing system reliability.

The storage devices can be hard disk drives, tapes, memory drives, optical storage drives or other storage devices for storing data. Such storage devices all are physical storage devices (PSDs).

A storage system (or computer system) does not actually consider one physical storage device (PSD) as a unit when managing data, but combines different sections from one or more PSDs as a logical drive (LD) or as a partition. When a controller maps the LD or the partition to a host for data access, the LD or the partition mapped is referred to as a logical unit. A LD or partition can be further divided into one or more data storage areas referred to as media extents. Many of data storage systems may replicate a portion or all of a volume to another volume integrally. Thus, whenever the original data are damaged or failed to be read, the replicated data can be used to recover the original data or substituted as the original data for other applications.

The source where the replicated data is copied from is referred to as a source volume, and the destination storing the replicated data is referred to as a destination volume. The date replication with the unit of a volume can be used for the following purposes: backing up, reporting or archiving the source volume; or substituting the source volume for performing any operations requiring the source volume, such as simulating, predicting and data mining, etc. Especially, data accessing operations usually perform a locking mechanism on the to-be-accessed data before actually access it, and thus it is inevitable to affect data reading efficiency and also to affect the normal data access of the host. Hence, if the destination volume is used to substitute the source volume for performing the aforementioned operations, the source volume can provide the host data accessing service without affecting the efficiency.

Volume copying and volume mirroring are two volume replication methods popularly used in industries, in which the volume copying is used for copying data of the source volume at a starting time point of the replication operation (i.e. the time point of issuing a split command) and it is generally a one-time copy, and the volume mirroring is used to consistently maintain a data synchronization relationship between two volumes, i.e. considering the destination volume as a mirror of the source volume. In conventional skills, the volume copying and the volume mirroring are implemented by two different architectures. Also, in the conventional skills, each of two volumes (i.e. source volume and destination volume) of a mirror pair requires maintaining a tracking table used for recording the mirroring state of each corresponding data block on the volume (source volume or destination volume), and recording the information whether the corresponding data block has been modified during the volume mirroring. A mirroring pair needs two tracking tables respectively stored in the source volume and the destination volume. If a volume A establishes a mirroring pair relationship respectively with each of volumes B, C and D, then the volume A needs to administer three tracking tables. Due to the features of the aforementioned conventional skills, the operations of the volume copying and the volume mirroring are quite complicated and inefficient.

Hence, if there is a unified architecture which can cover both operations of volume copying and volume mirroring and can simply the administration of tracking tables, or in other words, if there is a unified architecture under which the volume copying and the volume mirroring are merely operational options of a single unified volume synchronization function, then the operation efficiency of a storage system can be effectively promoted.

SUMMARY

Hence, an object of the present invention is to provide a method and an apparatus which can perform various volume replication operations such as volume copying and volume mirroring by using a unified architecture.

According to an aspect of the present invention, a method for performing volume replication is provided for allowing a destination volume to be synchronized (sync) with a source volume, and includes: allocating a first entry in a volume log table (VLT) of the source volume, and initializing a plurality of fields of the first entry comprising: setting a sequence number (SeqNum) defined in a first field of the first entry to an initial setting value; and setting an operation code (OpCod) defined in a second field of the first entry to an operation code representing a state of the source volume, wherein the initial setting value recorded in the first field of the first entry is further assigned to a first variable. The method for performing volume replication further includes: allocating a second entry in a VLT of the destination volume, and initializing a plurality of fields of the second entry comprising: setting an OpCod defined in a second field of the second entry to an operation code representing a state of the destination volume. The method for performing volume replication further includes: adding an increment to a value of a master sequence number variable of the destination volume, and copying the value of the master sequence number variable of the destination volume into a first field of the second entry in the VLT of the destination volume as a SeqNum defined therein, and into a fourth field of the first entry in the VLT of the source volume as an alternative volume's sequence number (AltVolSN) defined therein, wherein the value of the master sequence number variable of the destination volume is further assigned to a second variable. The method for performing volume replication further includes: setting a fourth field of the second entry in the VLT of the destination volume as a starting address, wherein the fourth field of the second entry is used for recording an index of a next data block to be synchronously replicated (DstVLT.NxtSynBlk); and performing a background copy (Background Copy of Source to Destination) procedure started from the starting address for copying the source volume to the destination volume.

According to another aspect of the present invention, a method for performing volume replication is provided and applied in a process of a synchronization operation between a destination volume and a source volume, wherein a split event occurs during the synchronization operation or when or after the synchronization operation is completed. The method for performing volume replication includes: allocating a first entry in a volume log table (VLT) of the source volume, and initializing a plurality of fields of the first entry comprising: setting a sequence number (SeqNum) defined in a first field of the first entry to an initial setting value; and setting an operation code (OpCod) defined in a second field of the first entry to an operation code representing a state of the source volume. The method for performing volume replication further includes: allocating a second entry in a VLT of the destination volume, and initializing a plurality of fields of the second entry comprising: setting an OpCod defined in a second field of the second entry to an operation code representing a state of the destination volume. The method for performing volume replication further includes: adding an increment to a value of a master sequence number variable of the destination volume, and copying the value of the master sequence number variable of the destination volume into a first field of the second entry in the VLT of the destination volume as a SeqNum defined therein, and into a fourth field of the first entry in the VLT of the source volume as an alternative volume's sequence number (AltVolSN) defined therein, wherein the value of the master sequence number variable of the destination volume is further assigned to a second variable. The method for performing volume replication further includes: setting a fourth field of the second entry in the VLT of the destination volume as a starting address, wherein the fourth field of the second entry is used for recording an index of a next data block to be synchronously replicated (DstVLT.NxtSynBlk); and adding an increment to a value of a master sequence number variable of the source volume, and copying the value of the master sequence number variable of the source volume into a first field of the first entry in the VLT of the source volume as a SeqNum defined therein, wherein the value of the master sequence number variable of the source volume is further assigned to a first variable. The method for performing volume replication further includes: allocating a third entry in the VLT of the destination volume, and initializing a plurality of fields of the third entry comprising: setting an OpCod defined in a second field of the third entry to an operation code representing a split state. The method for performing volume replication further includes: adding an increment to the value of the master sequence number variable of the destination volume again, and copying the value of the master sequence number variable of the destination volume into a first field of the third entry in the VLT of the destination volume as a SeqNum defined therein; and determining if the synchronization operation between the source volume and the destination volume is completed.

According to another aspect of the present invention, a disk array controller able to implement a data replication operation performed among a plurality of volumes in a physical storage device array (PSD array) is provided and includes: a memory used for buffering data transmitted between a host and the PSD array via the disk array controller; and a central processing circuitry (CPC) using a volume log table (VLT) and a volume block update table (VBUT) exclusively belonging to each of the volumes to perform the data replication operation, wherein an entry in the VLT has a first field used for recording a sequence number (SeqNum), a second field used for recording an operation code (OpCod), a third field used for recording an alternative volume's identification (AltVolID), and a fourth field used for recording a sequence number (AltVolSN) of the entry in the VLT of the alternative volume or for recording an index (NxtSynBlk) of a next data block itself to be synchronized; and wherein an entry in the VBUT records updated state information of a data block.

According to another aspect of the present invention, a method for performing volume replication operation includes forming a first mirroring pair composed of a first volume and a second volume; administering a volume log table (VLT) and a volume block update table (VBUT) of the first volume, wherein the VLT is used for recording synchronization state information after the first volume and the second volume forms the first mirroring pair, and the VBUT is used for recording updated state information of each data block of the first volume; forming a second mirroring pair composed of a first volume and a third volume; and administering the VLT and the VBUT of the first volume, wherein the VLT is used for recording synchronization state information after the first volume and the third volume forms the second mirroring pair, and the VBUT is used for recording updated state information of each data block of the first volume.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 11A to FIG. 11D depict actual examples of the volume block update tables (VBUTs) at a time point T according to the present invention, which are respectively corresponding to the examples shown in FIG. 10A to FIG. 10D;

FIG. 12A to FIG. 12E depict actual examples of the volume log tables (VLTs) at a time point T+t according to the present invention; and FIG. 13A to FIG. 13D depict actual examples of the volume block update tables (VBUTs) at a time point T+t according to the present invention, which are respectively corresponding to the examples shown in FIG. 12A to FIG. 12D.

DESCRIPTION OF THE PREFERRED EMBODIMENTS

Figure 1:
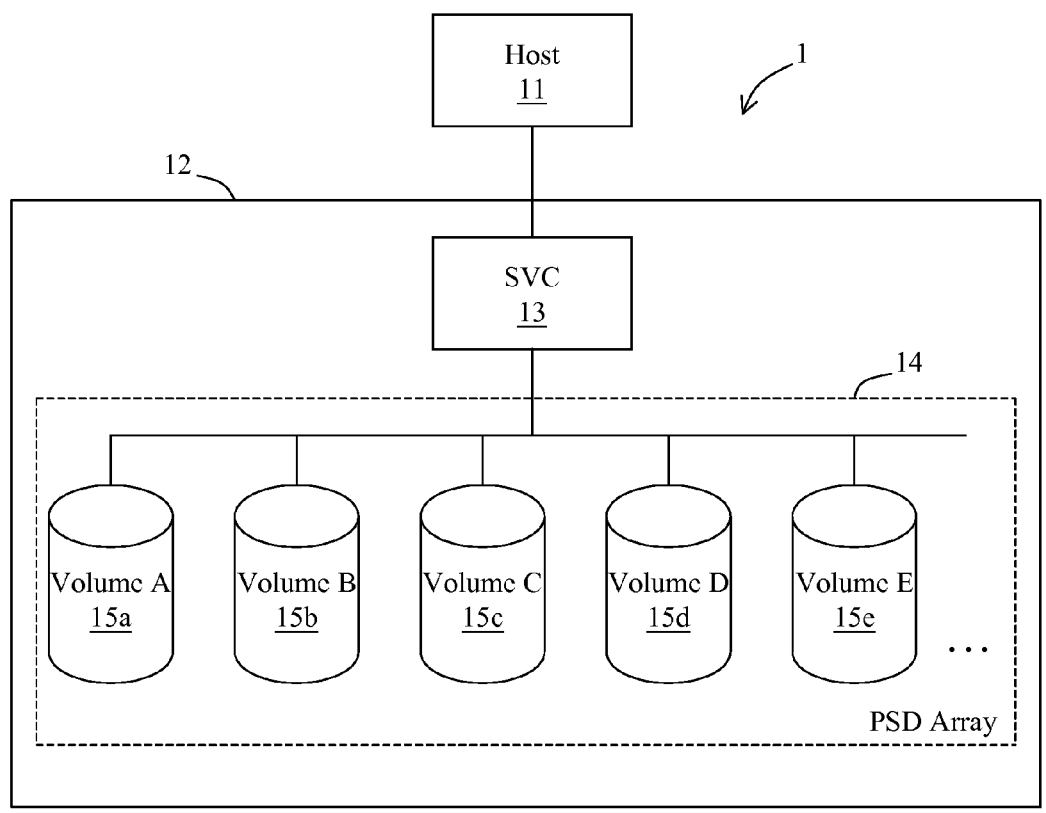
FIG. 1 depicts a schematic diagram showing a hardware architecture of a computer system applied in the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention is mainly to provide a method which uses a unified architecture to implement various volume replications including "volume copying" and "volume mirroring". Whenever a volume involves a mirroring pair with its alternative volume, its exclusive volume log table (VLT) and volume block update table (VBUT) are established. Thereafter, no matter how many synchronization or mirroring relationships are further established between the volume and other volumes, the volume merely has to administer one exclusive VLT and one exclusive VBUT. Thus, the technology provided by the present invention can simplify the complicated replication architecture used in the conventional technology and reduce the quantity of tables to be administered advantageously, and enables a storage system to be operated more efficiently.

In the method of performing volume replication, a "mirroring pair" relationship is first established between a source volume and a destination volume, and then, an initial mirroring procedure is started to replicate the source volume to the destination volume, which is referred to "synchronization" or "sync". During a sync procedure, when a host issues a write request to the source volume, if the block to be written has not been copied to the destination volume associated with the source volume yet, the written data carried by the write request has merely to be written into the source volume; otherwise, the written data has to be written into both the associated data blocks in the source volume and the destination volume of the same mirroring pair. After the initial sync procedure (or called initial mirroring procedure) is completed, both of the source and destination volumes of the mirroring pair enter a synchronization state, and thus any data changes of the source volume thereafter have to be simultaneously replicated to the destination volume. At this stage, the destination volume is considered as a mirror of the source volume. In accordance with the application needs, the mirroring relationship between the two volumes of the mirroring pair can be stopped at a certain time point, and such operation is referred to as a "split" operation. When a split command is issued, it means that the destination volume has to reserve the state of the source volume at the time point at which the split command is issued, and it also means that, after the time point, the mirroring-pair relationship between the source volume and the destination volume is broken, and the two volumes can be independently accessed or updated without needing to maintain the consistence between their respective data changes.

The split operation may occur at any time points during the mirroring process, which is mirroring the source volume to the destination volume, or after the completion of the mirroring process, or even, the split operation may not occur all the time. One of the methods to performing the split operation is issuing the split command as soon as the mirroring operation is started. This method, referred to as "volume copying", intends to replicate the state of the source volume at the time point at which the split command is issued, and in this situation the split command is generally a one-shot command. Relatively, if the mirroring relationship is substantially maintained between the two volumes all the time, and no split events occur during the synchronization, at or after the completion of the synchronization, that is, the synchronization relationship constantly existed between the two volumes, this replication method is referred to as "volume mirroring".

Referring to FIG. 1, it is a schematic diagram showing a hardware architecture of a computer system 1 applied in the present invention. The computer system 1 includes a host 11 and a storage virtualization subsystem (SVS) 12 connected thereto. Although only one host 11 and only one SVS 12 are shown in this embodiment, yet in actual applications, one host 11 may be connected to a plurality of SVSs 12; a plurality of hosts 11 may be connected to one SVS 12; or a plurality of hosts 11 may be connected to a plurality of SVSs 12.

The host 11 can be a host computer, such as a server system, a workstation, a personal computer, etc. The SVS 12 includes a storage virtualization controller (SVC) 13 and a physical storage device array (PSD array) 14 connected thereto. The SVC 13 can be a disk array controller or a JBOD (Just a Bunch Of Disks) emulator. Although only one PSD array 14 connected to one SVC 13 are shown in the figure, yet in actual applications, one or more PSD arrays 14 can be used and the host 11 also can be a SVC.

The SVC 13 receives an IO (Input/Output) request and its carried data (including control and data signals) from the host 11, and performs the IO request to map the IO request onto the PSD array 14 for performing data access, and also replies related data back to the host 11 if any. The PSD array 14 includes a plurality of PSDs. The PSDs can be, for example, hard disks. The SVC 13 can be used for enhancing performance and/or improving data availability, or used for increasing the storage capacity of one single logical media unit viewed by the host 11.

A volume is a virtualized logical storage unit. The SVC 13 virtualizes the PSD array 14 as one or more logical storage devices and presents the logical storage devices to the host 11 for accessing data. The host 11 can determine how many volumes should be formed from the one or more logical storage devices; each volume has its own file system. One volume may cover one or more PSDs, partial areas of the PSDs, or a partial area of only one PSD. For convenient expression in FIG. 1, it is assumed that the storage area of one volume just covers one PSD, but other embodiments of the present invention have no the limitation. Just as described above, one volume in the present invention may cover a partial area of one PSD, one or more PSDs, or the partial areas of the PSDs.

When the computer system 1 is performing a volume replication operation, all the contents of the entire source volume are completely copied to the destination volume. For example, as shown in FIG. 1, it is likely to copy a volume A 15a wholly to a volume B 15b, or maybe other possible examples. In this example, the volume A 15a acting as a data provider is a source volume, while the volume B 15b receiving the replicated data is a destination volume. The both capacities of the source volume and the destination volume may not be the same, but in general, the capacity of the destination volume has to be greater than or equal to the one of the source volume, thereby accommodating all of the data replicated from the source volume.

The capacity of one volume may be from a couple of gigabytes to hundreds of gigabytes, even up to terabytes. It takes some time to completely replicate (or called "sync" or "mirror") such large amount of data from one volume to the other volume. After the completion of the data replication, if no split command is issued, the "sync" state will be maintained between the two volumes. While the "mirroring" or "sync" state exists between the two volumes, the host 11 still can access data from the source volume. Further, the source volume or the destination volume after being split from the source volume may establish any kinds of volume replication relationships with other volumes individually. For recording the related information, referring to FIG. 2A and FIG. 2B, according to an embodiment of the present invention, whenever a volume is generated, a volume log table (VLT) 30 exclusively belonging to the volume itself is established for recording the sync state information between the volume itself and each of the other volumes, and a volume block update table (VBUT) 40 exclusively belonging to the volume itself is established for recording the updated state information of each data block of the volume itself. According another embodiment of the present invention, whenever a volume involves a mirroring pair with another volume, an exclusive VLT 30s is established for recording the sync state information between the two volumes, and an exclusive VBUT 40 is established for recording the updated state information of each data block of the volume itself.

Figure 2A:
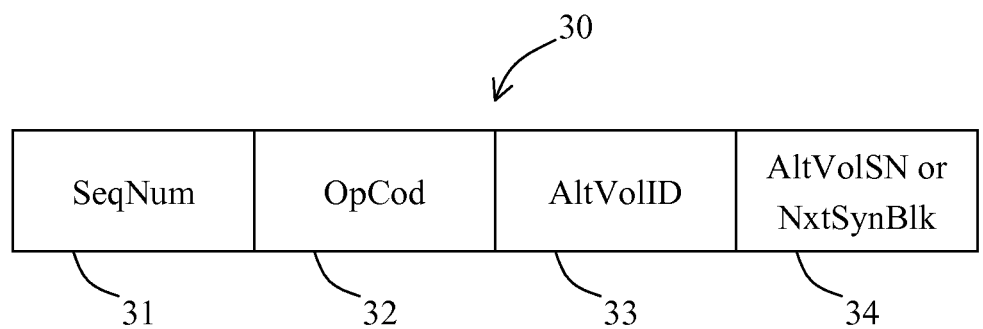
FIG. 2A depicts a data structure of a volume log table (VLT) provided by the present invention.

FIG. 2A merely depicts one entry and the fields contained therein in the VLT 30 as a representation for explanation. However, in actual operations, a VLT 30 may contain one or more VLT entries. Whenever the owner of the VLT 30 establishes a new relationship with another volume or has a state change itself, a new VLT entry is accordingly generated. One VLT entry contains four fields, which are a first field 31 for recording a sequence number (SeqNum), a second field 32 for recording an operation code (OpCod), a third field 33 for recording an alternative volume identification (AltVolID) in which the alternative volume is associated with the owner of this VLT 30 (VLT owner), and a fourth field 34 possessed of two possible functions in which one is for recording an alternative volume sequence number (AltVolSN), which is the sequence number of an entry in the VLT of the alternative volume associated with this VLT entry, and the other is for recording a next-sync-block index (NxtSynBlk) of the VLT owner itself, which is the next data block to be synchronized. The sequence of the four fields in a VLT entry shown in the above is merely one embodiment of the present invention, and in other embodiments, the four fields can be arranged in other sequences, which should fall within the scope or spirit of the present invention as long as the aforementioned information of the four fields can be completely recorded. The details of the four fields are further explained hereinafter.

At the beginning of creating a VLT entry, the sequence number (SeqNum) recorded in the first field 31 is an initial setting value. Taking the source volume as an example for explanation, the initial setting value can be "0 (null)" if, meaning that the source volume owning the VLT 30 has not been split off from the destination volume of which the identification (AltVolID) is recorded in the third field 33. Thereafter, if a split operation occurs, the sequence number (SeqNum) is assigned by a master sequence number (MstSN) variable. The master sequence number variable is incremented from "1", if also taking "0 (null)" being the initial setting value of the sequence number (SeqNum) as an example. That is, the sequence number (SeqNum) of a VLT entry first entering the split state is "1", the second sequence number (SeqNum) of another VLT entry entering the split state thereafter is "2", and so forth. In sum, as long as the value of the first field 31 of the VLT entry is not "0 (null)", it means that the source volume owning the VLT 30 has been split off from the destination volume of which the identification (AltVolID) is recorded in the third field 33, and on the contrary, if the value of the first field 31 of the VLT entry is "0 (null)", it means that the two volumes has not been split yet.

If the VLT 30 is belong to a destination volume, the initial setting value of the sequence number (SeqNum) recorded in the first field 31 of the VLT entry can be "1", representing the first sync event occurring. The sequence number (SeqNum) of the VLT entry associated with another sync event occurring later is also assigned by a master sequence number (MstSN) variable, which can be incremented from "2". As to whether the destination volume has been split off from the source volume, it can be determined by the second field 32 of the VLT entry in the destination volume, and has nothing to do with the sequence number (SeqNum) recorded in the first field 31 thereof.

Certainly, in other embodiments, the initial setting value of the sequence number (SeqNum) recorded in the first field 31 of the VLT entry of the source volume and that of the destination volume also can be set to other numeric values, and further, the incremental offset of the master sequence number (MstSN) also can be another numeric value instead of "1". For example, the initial setting value can be set to "2", and the incremental offset of the master sequence number (MstSN) variable can be set to "2", and thus the master sequence number (MstSN) variable will assign the values based on the pattern of 2, 4, 6 and so on to the sequence numbers (SeqNums) sequentially appearing in the first field 31 of the VLT entry. It should be noted that, if the initial setting value set to the sequence number (SeqNum)

recorded in the first field 31 of the VLT entry of the source volume is not "0 (null)", it is based on whether the sequence number (SeqNum) is the initial setting value or not to determine whether the source volume has entered a split state or not. For example, if the initial setting value is "1", a sequence number (SeqNum) of "1" means that the source volume has not been split off from the destination volume, and then the sequence number (SeqNum) of the VLT entry is assigned by the initial setting value plus an offset when the source volume is split.

In the present invention, there are three definitions of the operation code (OpCod) recorded in the second field 32 of the VLT entry, meaning that a volume can be situated at one of three states listed as follows:

SYNSRC: representing that the volume acts as a source volume in a synchronization relationship of two volumes;

SYNDST: representing that the volume acts as a destination volume in a synchronization relationship of two volumes; and SYNSPL: representing that the destination volume has been split off from a source volume.

The aforementioned three kinds of operation codes (OpCods) also may affect the contents recorded in the fourth field 34 of the VLT 30. If the operation code (OpCod) recorded in the second field 32 is "SYNSRC" or "SYNSPL", the fourth field 34 in the same VLT entry records the alternative volume sequence number (AltVolSN), which is the sequence number of an entry in the VLT of the alternative volume associated with this VLT entry; and if the operation code (OpCod) recorded in the second field 32 is "SYNDST", then the fourth field 34 in the same VLT entry records a next-sync-block index (NxtSynBlk) of the VLT owner itself, which is the next data block to be synchronized.

It should be noted that, although the above paragraphs use "SYNSRC", "SYNDST" and "SYNSPL" to represent three states of a volume as being a "source volume", a "destination volume" and having been "split" at a specific moment, yet the present invention is not limited thereto. In other embodiments, other codes can be used to represent these three states.

Figure 2B:
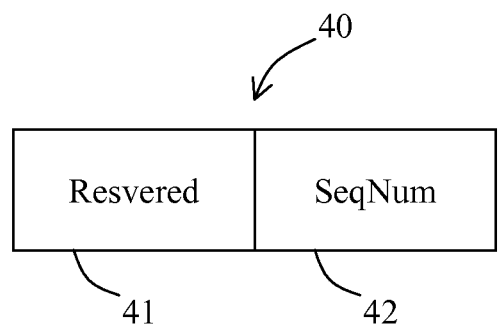
FIG. 2B depicts a data structure of a volume block update table (VBUT) provided by the present invention.

FIG. 2B merely depicts one entry containing fields in the VBUT 40 as a representation for explanation. However, in actual operations, a VBUT 40 may contain a plurality of VBUT entries, and each VBUT entry represents a data block of its owner; that is, the amount of the VBUT entries in a VBUT belonging to a volume is equal to the amount of the data blocks of the volume. One VBUT entry may contain two fields, which are a first field 41 representing a reserved field, and a second field 42 used for recording the sequence number of its associated VLT entry, meaning that the data in the data block associated with the VBUT entry are updated due to the event represented by the sequence number of the VLT entry, thereby tracking the state of each data block of the volume owning the VBUT, the state such as whether the data block has been synchronized or whether the data block is changed again after synchronization due to the data access from the host 11. The data length of one VBUT entry may be 32 bits or another proper length. In other embodiments, one VBUT entry may contain other number of fields in addition to two, and may only contain a second field 42 if simplification is considered.

Figure 3:
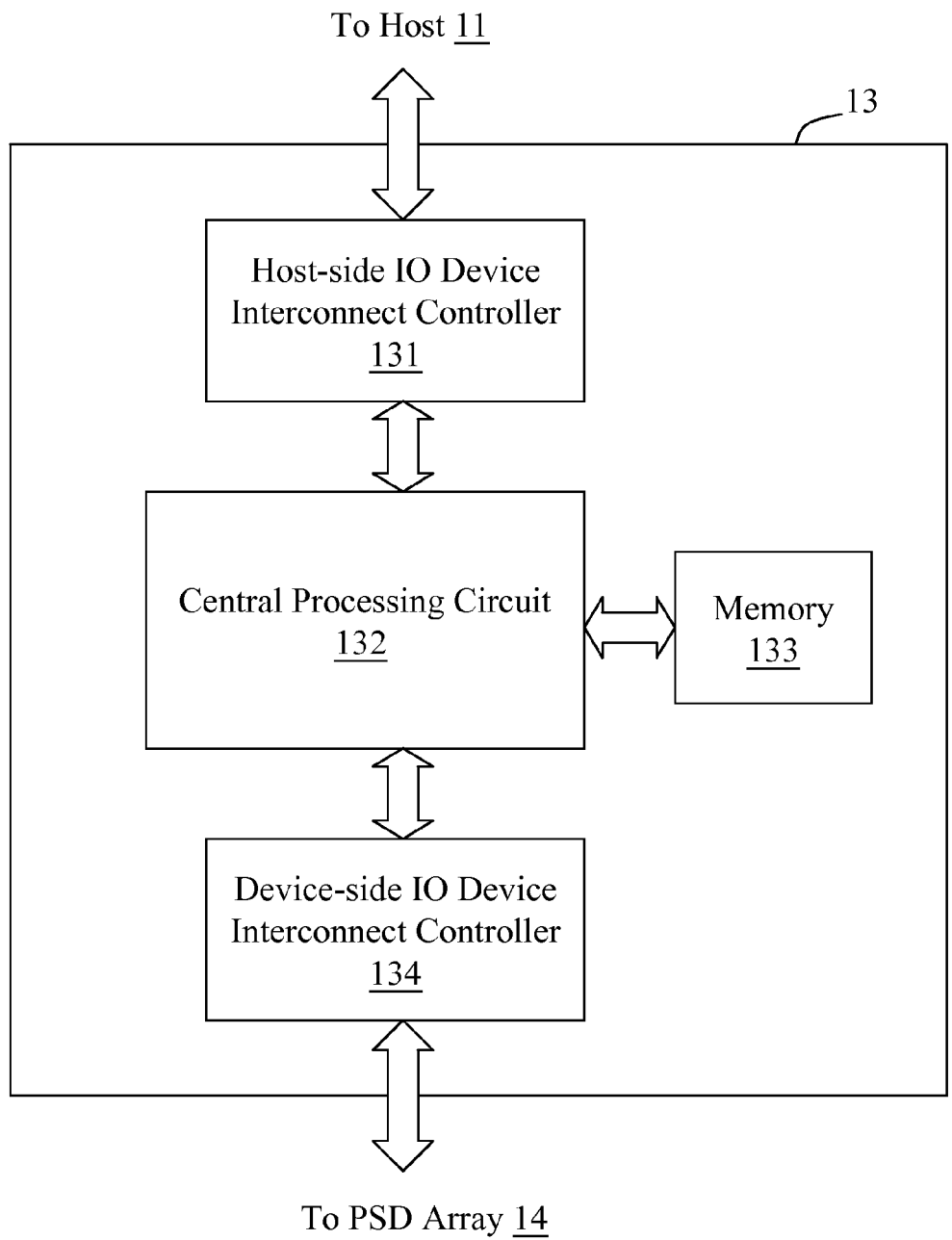
FIG. 3 depicts a schematic diagram showing an embodiment of a storage virtualization controller (SVC) used to implement the method of the present invention.

A replication method provided by the present invention for performing volume copying and volume mirroring under a unified architecture is enabled by the cross operations and applications between the VLT 30 and the VBUT 40, which will be described in detail later. The apparatus applying the method of the present invention is the SVC 13 shown in FIG. 1, and a schematic diagram showing the structure of the SVC 13 according to one embodiment is as shown in FIG. 3.

The main function of the SVC 3 is to map various sections of PSDs to form one or more logical storage devices visible to the host 11. After being received by the SVC 13, a host IO request issued from the host 11 first will be parsed and interpreted, and the related operations and data will be translated into one or more PSD IO requests.

In this embodiment, the SVC 13 includes a host-side IO device interconnect controller 131, a central processing circuit (CPC) 132, a memory 133 and a device-side IO device interconnect controller 134. Although these components are described with separate functional blocks herein, yet in actual applications, parts or all of the functional blocks can be integrated into one single chip.

The host-side IO device interconnect controller 131, which is connected to the host 11 and the CPC 132 as an interface and a buffer between the SVC 13 and the host 11, can receive an IO request and related data sent from the host 11, and coverts and transmits the IO request and the related data to the CPC 132.

The memory 133 is connected to the CPC 132 as a bufferer for buffering the data transmitted between the host 11 and the PSD array 14 through the CPC 132. In an actual application, the memory 133 can be a dynamic random access memory (DRAM), and the DRAM can be a synchronous dynamic random access memory (SDRAM).

The device-side IO device interconnect controller 134, which is disposed between the CPC 132 and the PSD array 14 as an interface and a buffer between the SVC 13 and the PSD array 14, can receive the IO request and the related data sent from the CPC 132, and maps and/or transmits the IO request and the related data to the PSD array 14.

The CPC 132 is a calculation center of the SVC 13. When the SVC 13 receives the host IO request from the host-side IO device interconnect controller 131, the CPC 132 will parse the host IO request, and perform some operations to respond to the host IO request, and transmit the requested data and/or reports and/or information from the SVC 13 to the host 11 via the host-side IO device interconnect controller 131. The volume replication method of the present invention can be enabled by programming codes. The program codes are stored in an internal memory (such as a ROM (not shown)) of the CPC 132 or the external memory 133, so that the program codes can be executed by the CPC 132.

There are some principles needing to be observed for performing the volume replication method of the present invention, which are explained as follows.

The First Principle

Any volume which is involved a sync operation cannot be designated as a destination volume of another sync operation. In other words, if a volume, which is participating one sync operation, is required to be the destination volume of another sync operation, the performing sync operation has be stopped first and the volume has to be split off from the original mirroring pair, and afterward the volume can be designated as the destination volume of another sync operation.

The Second Principle

An unsplit destination volume which is participating a sync operation cannot be presented alone to the host for data access. Only the source volume can be the accessed target to the host. Due to such characteristic, if a destination volume is temporarily off-line, it can return to be on-line to continuously perform the sync operation with the original sync configuration. Based on the same reason, since a destination volume cannot be a single target for the host IO request, it cannot be a source volume to another sync operations unless it has been split.

The Third Principle

During a sync operation and before the split of the source and destination volumes, if a re-synchronization (resync) operation is activated between the two volumes, the two volumes have to be split promptly via the steps of: setting the sequence number of the VLT entry of the source volume to an up-to-date sequence number, and adding a "SYNSPL entry" to the VLT of the destination volume, and then the resync operation can be performed.

The Fourth Principle

During a sync operation and before the split of the source and destination volumes, if the destination volume is off-line and meanwhile the source volume has updated its data due to a host IO request and the updated data block(s) has(have) been synchronously replicated, the two volumes have to be split promptly via the following step: setting the sequence number of the VLT entry of the source volume is an up-to-date sequence number. When the destination volume returns to be on-line, the sequence number (SeqNum) field 31 of the VLT entry of the source volume will be checked. If the field 31 is not the initial setting value such as "0 (null)", the destination volume will be recorded as "split" via the following step: adding a "SYNSPL entry" to the VLT of the destination volume. Thereafter, the synchronization operation can be re-activated to resynchronize the data in the two volumes.

The Fifth Principle

During a sync operation and after the time point that the two volumes are split off from each other, if the source volume has data changes but the original data in the updated data blocks cannot be copied to the destination volume beforehand, an "error bit" will be set on the latest "SYNSRC entry". In this situation, if the current sync operation has not finished yet, any actions try to perform a resync operation will be prohibited until the current sync operation is completed. The aforementioned step of setting an error bit on the VLT entry of the source volume is merely one embodiment of the present invention, and in other embodiments, the error bit can be set on the VLT entry of the destination volume, or stored in another recording table independently.

Before the detailed description of the processes of the method of the present invention, the definitions of some specific code names are explained as follows:

DstMstSN: a master sequence number variable of a destination volume;

SrcMstSN: a master sequence number variable of a source volume;

DstVBUT: a VBUT entry corresponding to a data block of a destination volume which is being processed;

SrcVBUT: a VBUT entry corresponding to a data block of a source volume which is being processed;

DstVLT: a VLT entry of a destination volume which is in operation; and

SrcVLT: a VLT entry of a source volume which is in operation.

Figure 4A:
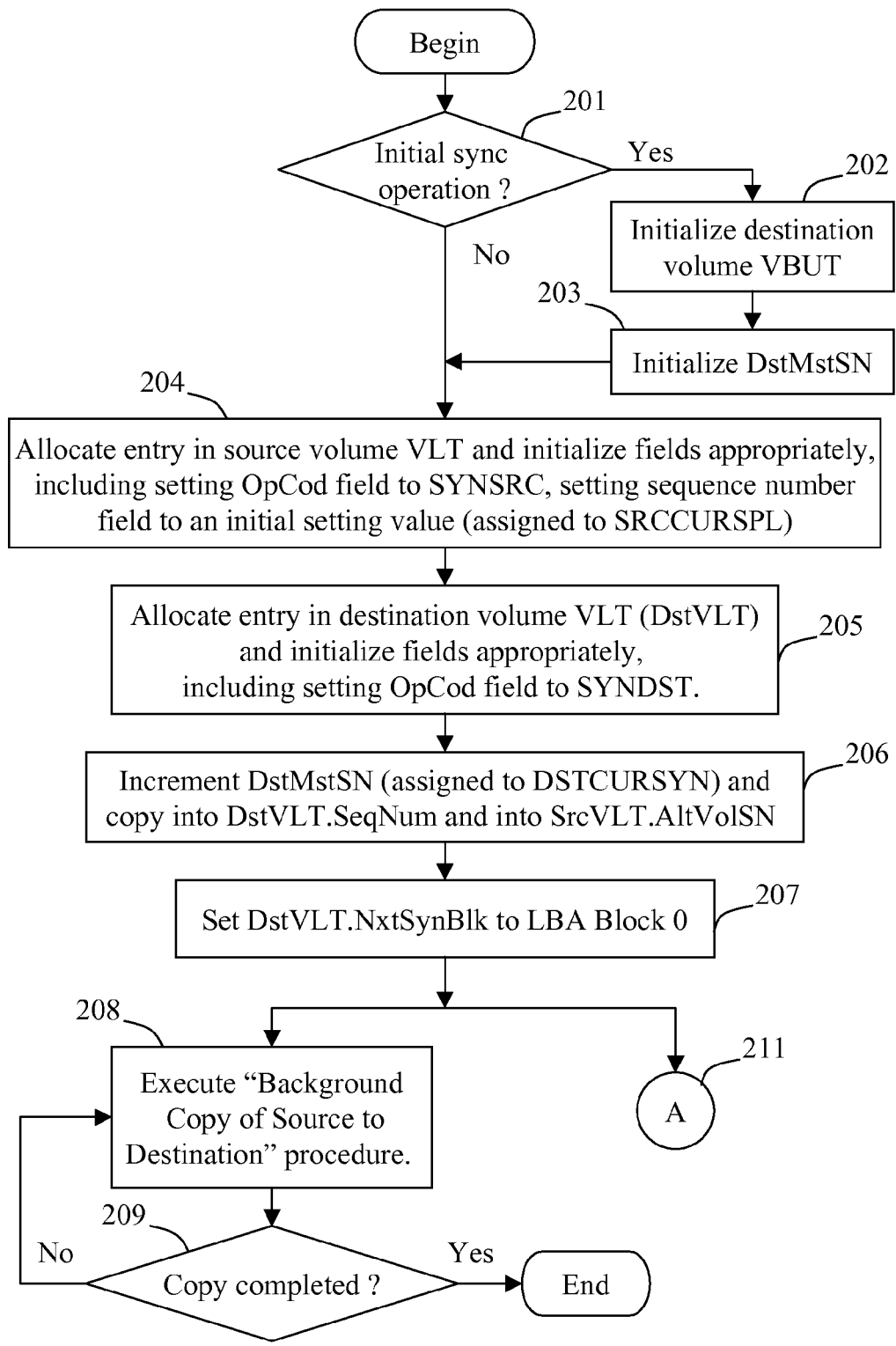
FIG. 4A to FIG. 4C depict a flow chart showing a method for synchronously replicating a source volume to a destination volume according to an embodiment of the present invention, wherein the source volume and the destination volume are not split.
Figure 4B:
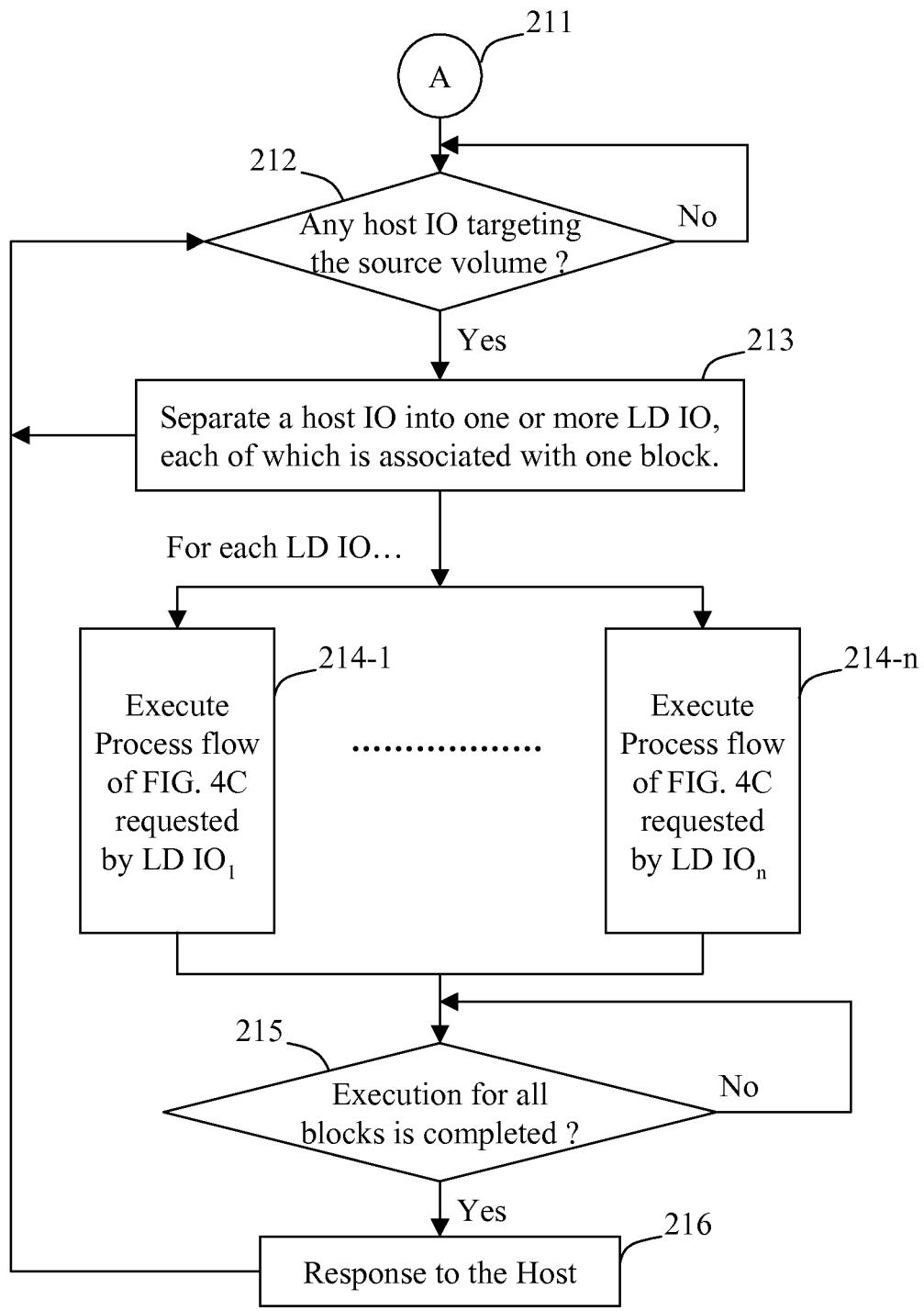
Figure 4C:
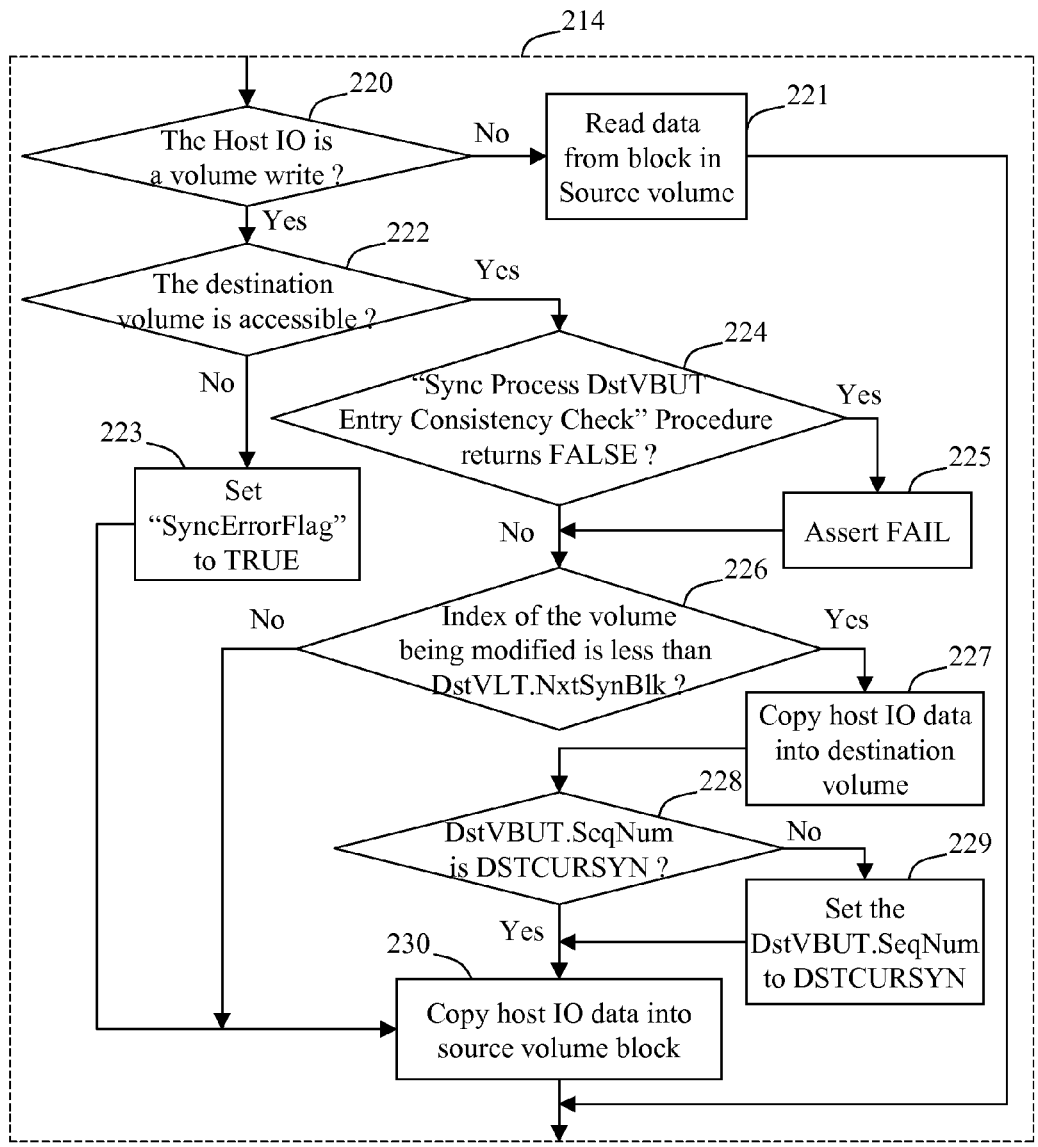

Referring to FIG. 4A to FIG. 4C, which depict a flow chart showing a method of synchronously replicating a source volume to a destination volume according to an embodiment of the present invention, wherein the source volume and the destination volume are not split off from each other yet, and a relationship of sync or mirroring is being maintained between the two volumes. Please refer to FIG. 2A and FIG. 2B simultaneously for the below description. In FIG. 4A, when the process begins, it is first performed to determine if the procedure is an initial sync operation (step 201). If the determination result of step 201 is yes, the VBUT 40 of the destination volume is initialized (step 202) and the DstMstSN variable of the destination volume is initialized (step 203). The way of initialization is to set each entry in the VBUT 40 and the DstMstSN variable to be equal to their initial setting values respectively. The initial setting values can be "0 (null)" in one embodiment or another possible values in the other embodiments.

If the determination result of step 201 is not a initial sync operation or after steps 202 and 203 are performed, step 204 is performed to allocate an entry (SrcVLT) in the VLT 30 of the source volume and initialize the fields thereof appropriately, including setting the OpCod of the second field 32 to "SYNSRC", and setting the sequence number of the first field 31 to an initial setting value such as "0 (null)". Further, the initial setting value of the sequence number is assigned to a first variable which is referred to as a "SRCCURSPL" variable in this embodiment. Then, step 205 is performed to allocate an entry (DstVLT) in the VLT 40 of the destination volume and initialize the fields thereof appropriately, including setting the OpCod of the second field 32 to "SYNDST". Then, step 206 is performed to add one unit to the value of the DstMstSN variable and copy the value of the DstMstSN variable to the first field 31 of the DstVLT (shown as DstVLT.SeqNum) and to the fourth field 34 of the SrcVLT (shown as SrcVLT.AltVolSN). Further, the current value of the DstMstSN variable is assigned to a second variable which is referred to as a "DSTCURSYN" variable. Then, step 207 is performed to set the fourth field 34 of the DstVLT (shown as DstVLT.NxtSynBlk) to the block index 0, standing for a data block of which the LBA (logical block addressing) index is 0.

Figure 6:
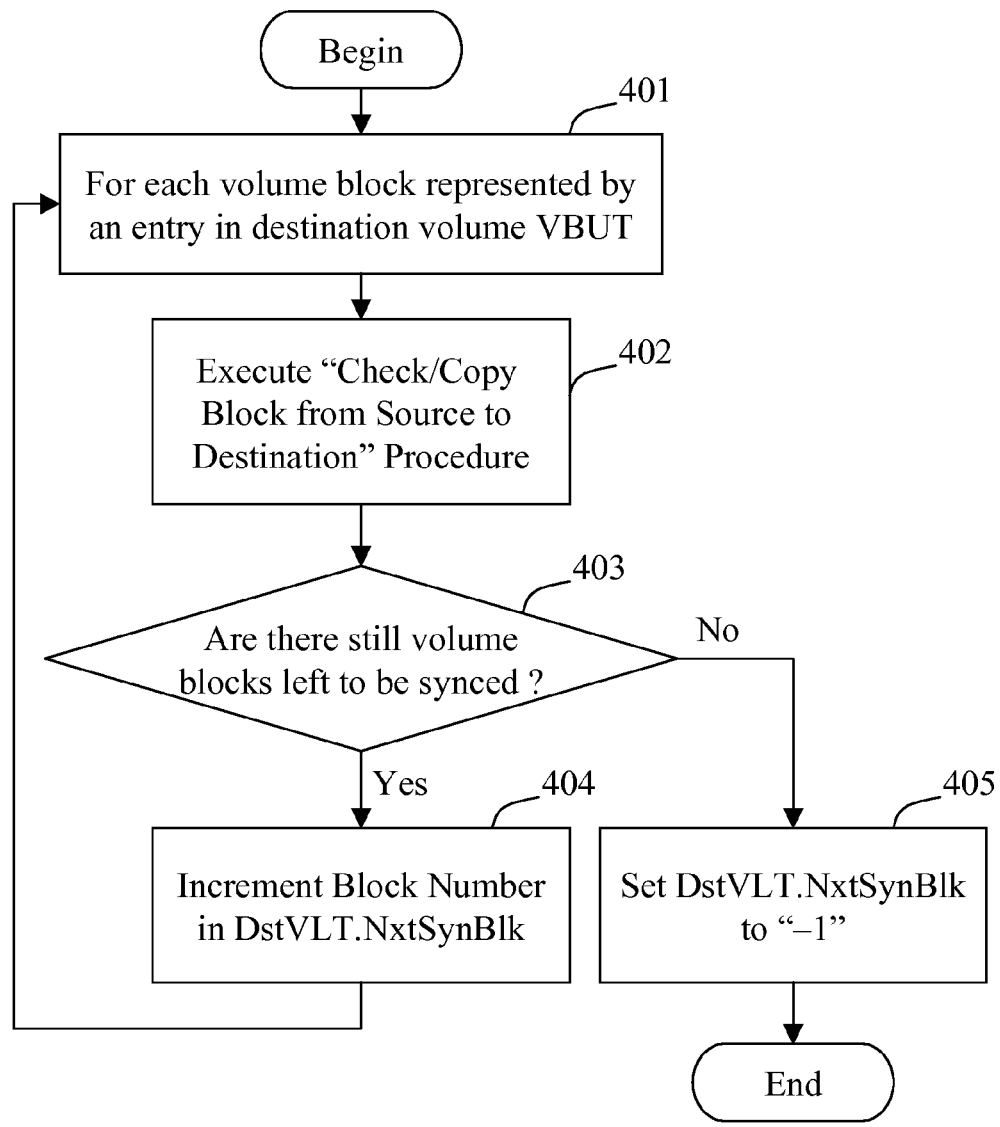
FIG. 6 depicts a flow chart showing a background copy procedure for copying the source volume to the destination volume ("Background Copy of Source to Destination" procedure) according to an embodiment of the present invention.

After completion of the above steps, there are two procedures following and executed in parallel, one of which is a procedure of "Background Copy of Source to Destination" shown in step 208 (the details of the procedure as shown in FIG. 6) and the other one of which is a procedure activated by the appearance of a host IO request by entering the join point A 211 (the details of the procedure as shown in FIG. 4B and FIG. 4C as described later).

The "Background Copy of Source to Destination" procedure called by step 208 is mainly performing an operation of copying data from the source volume to the destination volume in a background environment. During the operation of this procedure, a determination condition is consistently checked, which is whether all of the data copy processes are completed (step 209). If the determination result is yes, then the entire procedure of FIG. 4A goes to the end; otherwise, the "Background Copy of Source to Destination" procedure is continuously running. The details of the "Background Copy of Source to Destination" procedure will be described when FIG. 6 is introduced.

As described above, it takes a certain period of time to completely copy the source volume with an enormous capacity to the destination volume. During this period of time, the host 11 still need to access data from the source volume at any time as usual. It should be noted that, since the destination volume is not split off from the source volume yet, the second principle described above has to be followed, which is, an unsplit destination volume which is participating a sync operation can not be presented alone to the host for data access. Hence, in this procedure, only the source volume can be presented as a data access target for the host 11.

Referring to FIG. 4B, after entering the present process flow from the join point A 211, step 212 is first performed to inquire if there is any host IO request targeting the source volume. If the determination result of step 212 is no, the present process flow stays at the inquiry state of step 212; if the determination result of step 212 is yes, the present process flow enters step 213 to parse the host IO request and transform it into one or more LD (logical drive) IO (Input/Output) requests, each of which is targeting a data block of the source volume to be accessed. Thereafter, the process flow is divided into two directions: one goes to return to step 212 to continuously determine if there is any host IO request targeting the source volume; the other goes to execute the process flow of FIG. 4C requested by each of the LD IO requests (step 214). For example, if there are n number of LD IO requests (LD IO$_1$ . . . LD IO$_n$) going to access n number of data blocks in the source volume, there will be n number of process flows (steps 214-1 . . . 214-n) of FIG. 4C triggered and executed simultaneously. Whenever the process flow associated with any one of the LD IO requests is completed, step 215 is performed to determine whether all of the process flows (steps 214-1 . . . 214-n) executed in parallel are completed or not. If the determination result of step 215 is no, the process flow stays at the inquiry state of step 215; if the determination result of step 215 is yes, step 216 is performed to response to the host that the host IO request is completed, and then the process flow returns to step 212 to determine if there is any other host IO request targeting the source volume.

It should be noted that, in FIG. 4B, as long as a host IO request appears to access data from the source volume, the host IO request is immediately processed by entering the process flow via step 212, no matter whether the previous host IO request(s) is(are) completed or not.

Figure 5:
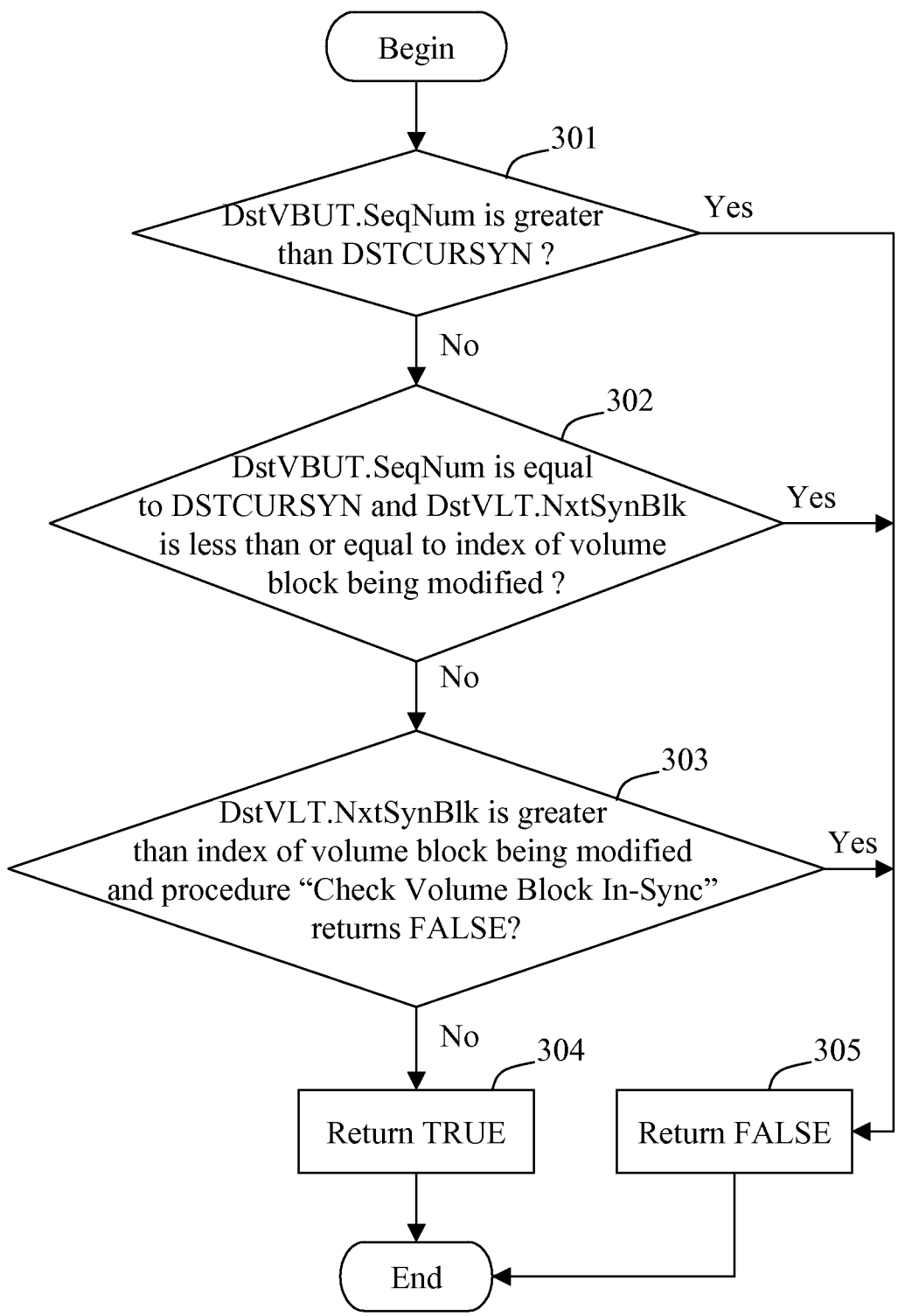
FIG. 5 depicts a flow chart showing a procedure of a volume block update table (VBUT) entry consistency check to the destination volume during synchronization ("Sync Process DstVBUT Entry Consistency Check" procedure) according to an embodiment of the present invention.

Referring to FIG. 4C, it shows a procedure for accessing a data block associated with each of the LD IO requests. The procedure shown in FIG. 4C is equivalent to a processing block of step 214 shown in FIG. 4B. At first, step 220 is performed to determine if the host IO request is intending to write data into the source volume; that is, if the host IO request is a volume write request. If the determination result of step 220 is no, it means that the host IO request is intending to read data, so step 221 is performed for directly reading data from a data block in the source volume (source volume block), and then the procedure returns to step 215 shown in FIG. 4B for checking the determination condition thereof. If the determination result of step 220 is yes, step 222 is performed to further determine if the destination volume is accessible. If the destination volume is not accessible at the time, a "synchronization error flag (SyncErrorFlag)" is set to "TRUE" (step 223), and the data carried by the host IO request (Host IO data) which is to be written is only copied to the source volume block (step 230), and then the procedure returns to step 215 shown in FIG. 4B for checking the determination condition thereof. If the determination result of step 222 is yes, step 224 is performed to call a procedure of "Sync Process DstVBUT Entry Consistency Check", which performs the consistency check of the VBUT entry of the destination volume, and to check if the returned value of the "Sync Process DstVBUT Entry Consistency Check" procedure is "FALSE" or not. Wherein the details of the "Sync Process DstVBUT Entry Consistency Check" procedure is shown in FIG. 5 and will be explained later. If the determination result of step 224 is yes, a failure message is asserted and issued (step 225). If the determination result of step 224 is no or after step 225 is completed, step 226 is performed to further determine if the index of the data block of the source volume being modified (going to be written) is less than the DstVLT.NxtSynBlk, which is the index of the data block next to be synchronously replicated and is recorded in the fourth field 34 of the VLT entry of the destination volume. If the determination result of step 226 is yes, it means that the data block of the source volume to be written has been synchronously replicated to the destination volume, and thus the data (Host IO data) to be written by the host IO request has to be copied into the corresponding data block on the destination volume (step 227), thereby maintaining the two volumes in the synchronization state. Afterward, step 228 is performed to further determine if the DstVBUT.SeqNum is equal to the value of the DSTCURSYN variable (the second variable); namely, if the sequence number of the VBUT entry of the destination volume is equal to the value of the DSTCURSYN variable. If the determination result of step 228 is no, the DstVBUT.SeqNum is set to be equal to the value of the DSTCURSYN variable (the second variable) (step 229), meaning that the corresponding data block of the destination volume is updated during the event represented by the DSTCURSYN variable. If the determination result of step 228 is yes or after step 229 is completed, step 230 is performed to copy the host IO data (the data to be written by the host IO request) to the source volume block (the associated data block in the source volume). If the determination result of step 226 is no, step 230 is performed as well to copy the host IO data to the source volume block. Thereafter, the procedure shown in FIG. 4C goes to the end and returns to step 215 shown in FIG. 4B for checking the determination condition thereof.

Referring to FIG. 5, it depicts a flow chart showing a procedure of a VBUT entry consistency check to the destination volume during synchronization ("Sync Process DstVBUT Entry Consistency Check" procedure) according to an embodiment of the present invention. This procedure is called by step 224 shown in FIG. 4C, and mainly has three determination conditions. The procedure returns a message of "FALSE" (step 305) as long as any of the three determination conditions is met, and returns a message of "TRUE" if all of the three determination conditions are not met (step 304). The three determination conditions are described in detail as follows.

The determination condition 1 performed at step 301 is to determine if the DstVBUT.SeqNum is greater than the value of the DSTCURSYN variable (the second variable); namely, if the sequence number of the VBUT entry, which is currently processed, of the destination volume is greater than the value of the DSTCURSYN variable. Since the destination volume is not split off from the source volume yet when the procedure shown in FIG. 5 is executed, the determination condition 1 that the DstVBUT.SeqNum is greater than the value of the DSTCURSYN variable should not happen. Therefore, in case that the determination condition 1 is met, this procedure returns a message of "FALSE" immediately (step 305); otherwise, this procedure goes to check the next determination condition.

The determination condition 2 performed at step 302 is to determine if the DstVBUT.SeqNum is equal to the value of the DSTCURSYN variable (the second variable) (namely, if the sequence number of the VBUT entry, which is currently processed, of the destination volume is equal to the value of the DSTCURSYN variable), and if the DstVLT.NxtSynBlk, standing for the index of the next data block to be synchronously replicated (NxtSynBlk) recorded in the fourth field 34 of the VLT entry, which is currently processed, of the destination volume, is less than or equal to the index of the data block which is being modified. Since the two respective conditions of the determination condition 2 are contradictory to each other, this procedure will return a message of "FALSE" immediately (step 305) when the determination condition 2 is met; otherwise, this procedure goes to check the next determination condition.

The determination condition 3 performed at step 303 is to determine if the DstVLT.NxtSynBlk, which stands for the index of the next data block to be synchronously replicated (NxtSynBlk) recorded in the fourth field 34 of the VLT entry of the destination volume which is currently processed, is greater than the index of the data block which is being modified (meaning that the data block has be synchronously replicated), and if a procedure of checking whether data blocks of the source volume and the destination volume are in synchronization ("Check Volume Block In-Sync" procedure) returns a value of "FALSE". Wherein the details of the "Check Volume Block In-Sync" procedure will be shown in FIG. 8 and described later. Because the data blocks, which have been synchronously replicated, in the destination volume have to keep their states until the destination volume is split off from the source volume, this procedure will return a message of "FALSE" when the determination condition 3 is met (step 305); otherwise, the procedure returns a message of "TRUE" (step 304).

Figure 8:
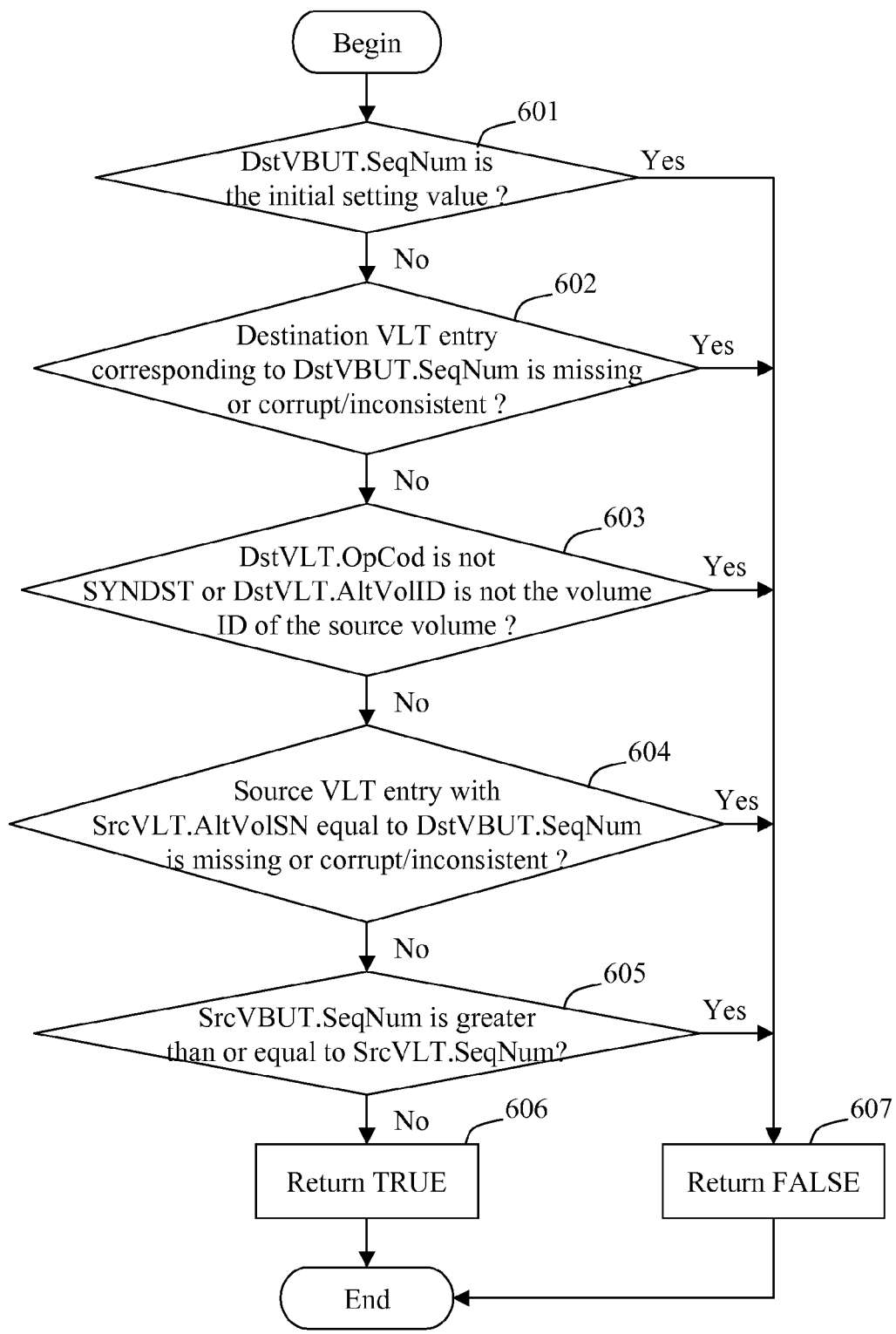
FIG. 8 depicts a flow chart showing a procedure of checking whether data blocks of the source volume and the destination volume are in synchronization ("Check Volume Block In-Sync" procedure) according to an embodiment of the present invention.

Referring to FIG. 8, it depicts a flow chart showing a procedure of checking whether data blocks of the source volume and the destination volume are in synchronization ("Check Volume Block In-Sync" procedure) according to an embodiment of the present invention. Wherein the "Check Volume Block In-Sync" procedure is called by step 303 of FIG. 5 described above, and also will be called by other procedures described later. This procedure manly has five determination conditions. The procedure returns a message of "FALSE" (step 607) as long as any of the five determination conditions is met, and returns a message of "TRUE" if all of the five determination conditions are not met (step 606). The five determination conditions are described in detail as follows.

The determination condition 1 performed at step 601 is to determine if the DstVBUT.SeqNum (standing for the sequence number of the VBUT entry, which is currently processed, of the destination volume) is equal to the initial setting value, such as "0 (Null)". If the determination result of step 601 is yes, it means that the data block is still under the stage of the initialization operation and certainly is not at "In-Sync (already in synchronization)" state. Hence, a message of "FALSE" is returned (step 607); otherwise, this procedure goes to check the next determination condition.

The determination condition 2 performed at step 602 is to determine if the VLT entry of the destination volume associated with the DstVBUT.SeqNum (standing for the sequence number of the VBUT entry, which is currently processed, of the destination volume) is missing, or can be found but the data cannot be read (maybe corrupted), or the data is inconsistent. If the determination result of step 602 is yes, a message of "FALSE" is returned (step 607); otherwise, this procedure goes to check the next determination condition.

The determination condition 3 performed at step 603 is to determine if the DstVLT.OpCod (standing for the OpCod recorded in the second field 32 of the VLT entry, which is currently processed, of the destination volume) is not "SYNDST", or the DstVLT.AltVolID (standing for the Alt-VolID recorded in the third field 33 of the VLT entry, which is currently processed, of the destination volume) is not the volume identification (ID) of the source volume corresponding thereto. If the determination result of step 603 is yes, a message of "FALSE" is returned (step 607); otherwise, this procedure goes to check the next determination condition.

The determination condition 4 performed at step 604 is to determine if the VLT entry of the source volume with the SrcVLT.AltVolSN (standing for the sequence number (Alt-VolSN) of the VLT entry of the destination volume recorded in the fourth field 34 of the VLT entry of the source volume), which is equal to the DstVBUT.SeqNum (standing for the sequence number of the VBUT entry, which is currently processed, of the destination volume), is missing, or can be found but cannot be read (maybe corrupted), or is inconsistent. If the determination result of step 604 is yes, a message of "FALSE" is returned (step 607); otherwise, this procedure goes to check the next determination condition.

The determination condition 5 performed at step 605 is to determine if the SrcVBUT.SeqNum (standing for the sequence number of the VBUT entry, which is currently processed, of the source volume) is greater than or equal to the SrcVLT.SeqNum (standing for the sequence number (SeqNum) recorded in the first field 31 of the VLT entry, which is currently processed, of the source volume). If the determination result of step 605 is yes, it means that the data in the data block on the source volume are changed again after being synchronously replicated to the destination volume, so a message of "FALSE" is returned (step 607); otherwise, a message of "TRUE" is returned (step 606).

Figure 7:
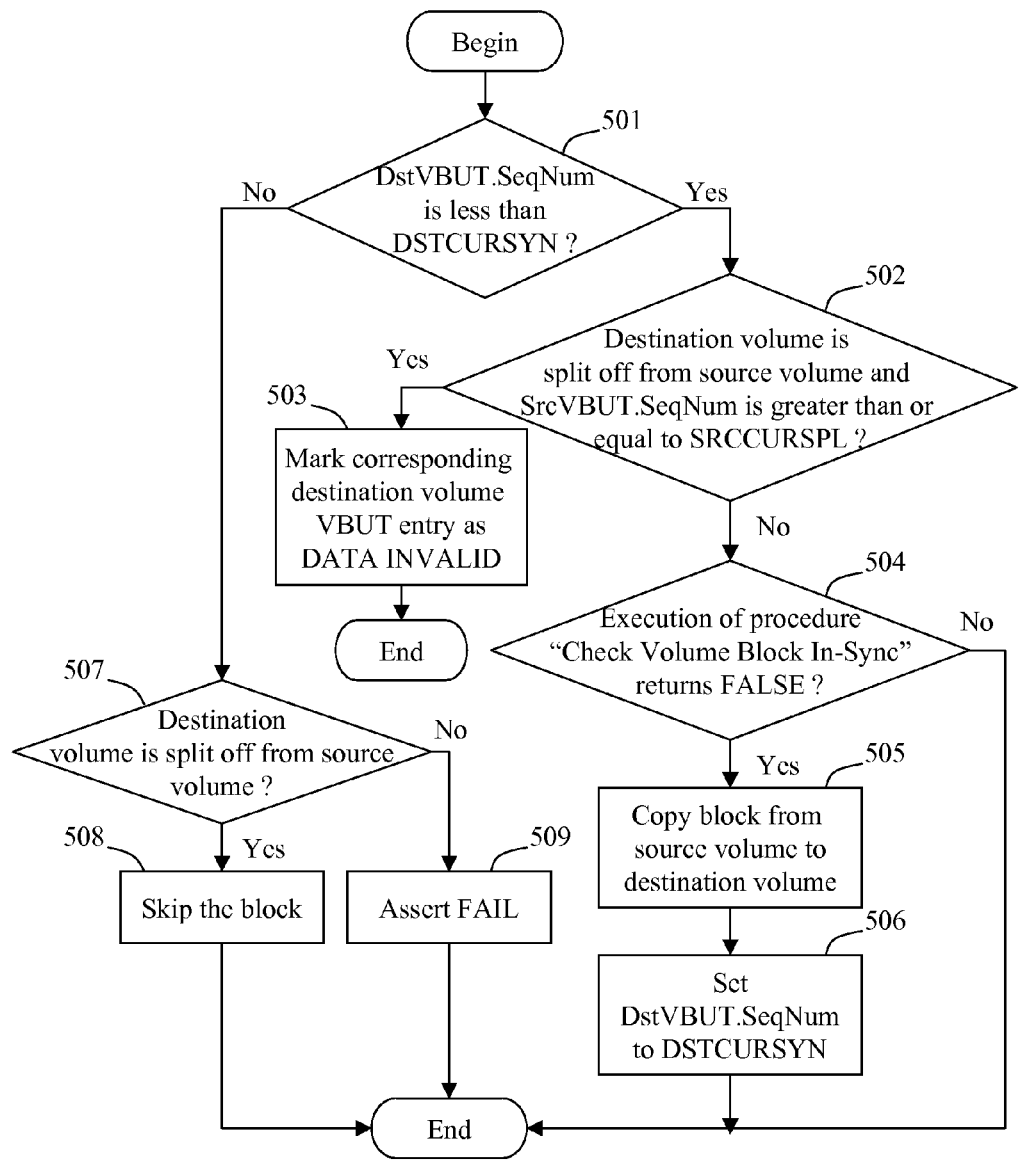
FIG. 7 depicts a flow chart showing a procedure of checking/copying data blocks from the source volume to the destination volume ("Check/Copy Block from Source to Destination Volume" procedure) according to an embodiment of the present invention.

Referring to FIG. 6, it depicts a flow chart showing the procedure of Background Copy of Source to Destination according to an embodiment of the present invention. This procedure is called by step 208 shown in FIG. 4A described above, and also is called by other procedures described later. For each data block represented by a VBUT entry of the destination volume (step 401), step 402 is performed to call and execute a procedure of checking/copying data blocks from the source volume to the destination volume ("Check/Copy Block from Source to Destination" procedure), wherein the details of the "Check/Copy Block from Source to Destination" procedure is shown in FIG. 7 and will be described later. After step 402 is completed, step 403 is performed to determine if there are still other data blocks of the source volume left to be synchronously replicated. If the determination result of step 403 is yes, the block number of the DstVLT.NxtSynBlk (standing for the index of the next data block to be synchronously replicated (NxtSynBlk) recorded in the fourth field 34 of the VLT entry, which is currently processed, of the destination volume) is incremented by 1 unit (step 404), and then the procedure returns to step 401 to perform another round of steps 402 to 403 for the next data block. If the determination result of step 403 is no, the value of the DstVLT.NxtSynBlk (standing for the index of the next data block to be synchronously replicated (NxtSynBlk) recorded in the fourth field 34 of the VLT entry, which is being processed, of the destination volume) is set to "−1" (step 405), meaning that all of the data blocks have been synchronously replicated, and then this procedure goes to the end. It should be noted that setting the value of the DstVLT.NxtSynBlk to "−1" is merely an embodiment of the present invention; in other embodiments, any expression using a proper numerical value to achieve the same effect should fall within the scope or spirit of the present invention, for example, setting the DstVLT.NxtSynBlk to "−2".

Referring to FIG. 7, it depicts a flow chart showing a procedure of checking/copying data blocks from the source volume to the destination volume ("Check/Copy Block from Source to Destination" procedure) according to an embodiment of the present invention, wherein the procedure is called by step 402 shown in FIG. 6. At first, step 501 is performed to determine if the DstVBUT.SeqNum (standing for the sequence number of the VBUT entry, which is currently processes, of the destination volume) is less than the value of the DSTCURSYN variable (the second variable). If the determination result of step 501 is yes, step 502 is performed to further determine if the destination volume is split off from the source volume and if the SrcVBUT.SeqNum (standing for the sequence number of the corresponding VBUT entry of the source volume) is greater than or equal to the value of the SRCCURSPL variable (the first variable). If the determination result of step 502 is yes, it means that the data block of the source volume has been modified and its original data before the modification is not copied to the destination volume beforehand, thus causing the data in the corresponding data block of the destination volume to be unsynchronized with the one in the source volume, so that the VBUT entry of the corresponding data block of the destination volume is marked as "DATA INVALID" (step 503), and then the procedure goes to the end. If the determination result of step 502 is no, step 504 is performed to execute the procedure of "Check Volume Block In-Sync", the details of which are already shown and explained in FIG. 8 above, and determine if its returned value is "FALSE". If the determination result of step 504 is yes, it means that the corresponding data blocks of the source volume and the destination volume are not synchronized yet, and thus step 505 is performed to copy the block data of the source volume to the destination volume. Then, step 506 is performed to set the DstVBUT.SeqNum (standing for the sequence number of the VBUT entry, which is currently processes, of the destination volume) to the value of the DSTCURSYN variable (the second variable), and thereafter the procedure goes to the end. If the determination result of step 504 is no, it means that the corresponding data blocks of the source volume and the destination volume have been synchronized, and thus no further process is required and the procedure directly goes to the end.

If the determination result of step 501 is no, step 507 is performed to further determine if the destination volume is split off from the source volume. If the determination result of step 507 is yes, step 508 is performed to skip the block and the procedure goes to the end. If the determination result of step 507 is no, step 509 is performed to assert a failure message, and then the procedure goes to the end.

Referring to FIG. 9A to FIG. 9D, the four figures together depict a flow chart showing a method for synchronously replicating a source volume to a destination volume according to another embodiment of the present invention, wherein the source volume and the destination volume have been split off from each other, and the split time point may be appearing during the synchronization, when or after the synchronization is completed. The process flow shown in FIG. 9A to FIG. 9D may be performed after steps 201-207 shown in FIG. 4A, meaning that a split event occurs at a specific time point during or after the synchronization of the source volume and the destination volume. Please also refer to FIG. 2A and FIG. 2B for the process flow described below. At first, the value of the SrcMstSN is incremented by 1 unit and copied to the first field 31 of the VLT of the source volume (SrcVLT.SeqNum); in addition, the current value of the SrcMstSN is assigned to the aforementioned first variable (SRCCURSPL) (step 701). Then, step 702 is perform to allocate an entry in the VLT 30 of the destination volume (DstVLT) and initialize its fields appropriately including setting the operation code (OpCod) recorded in the second field 32 to "SYNSPL". Afterward, the value of the DstMstSN variable is incremented by 1 unit and copied into the first field 31 of the DstVLT (DstVLT.SeqNum), and additionally, the current value of the DstMstSN is assigned to a third variable (referred to as "DSTCURSPL" in this embodiment) (step 703). It should be noted that before entering step 703 to be incremented by 1 unit, the value of the DstMstSN variable has been assigned to the second variable (DSTCURSYN) in step 206 shown in FIG. 4A, and thus the value of the third variable (DSTCURSPL) is different from that of the second variable (DSTCURSYN) by 1 unit. After the completion of the above steps, there are two procedures executed in parallel subsequently, including: the procedure of "Background Copy of Source to Destination" (its detailed process flow is already shown and explained in FIG. 6 above) called by step 705, and a procedure after entering a join point B 706 (its detailed process flow will be shown in FIG. 9B to FIG. 9D and will be explained later), which is activated by the appearance of a host IO request.

The procedure of "Background Copy of Source to Destination" called by step 705 mainly executes an operation for copying the data of the source volume to the destination volume in a background environment. During the operation of the procedure of "Background Copy of Source to Destination", step 704 is consistently performed to determine if the synchronization operation of the source volume to the destination volume is completed. If the determination result of step 704 is yes, the process flow for the background copy goes to the end; otherwise, the procedure of "Background Copy of Source to Destination" is continuously performed until the determination result of step 704 is yes and then the process flow for the background copy goes to the end.

Figure 9A:
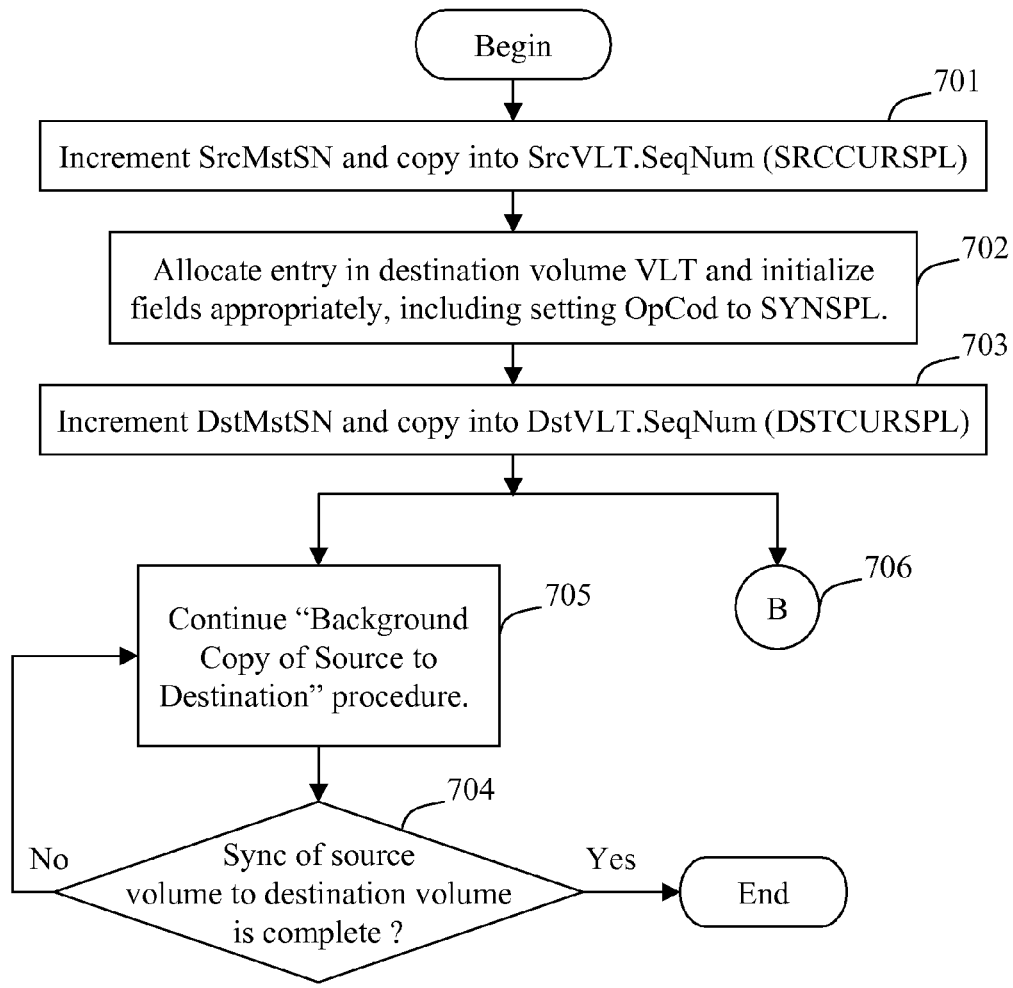
FIG. 9A to FIG. 9D depict a flow chart showing a method for synchronously replicating a source volume to a destination volume according to an embodiment of the present invention, wherein the source volume and the destination volume have been split, and the time point of splitting the two volumes may occur during synchronization, when synchronization is completed, or after synchronization is completed.
Figure 9B:
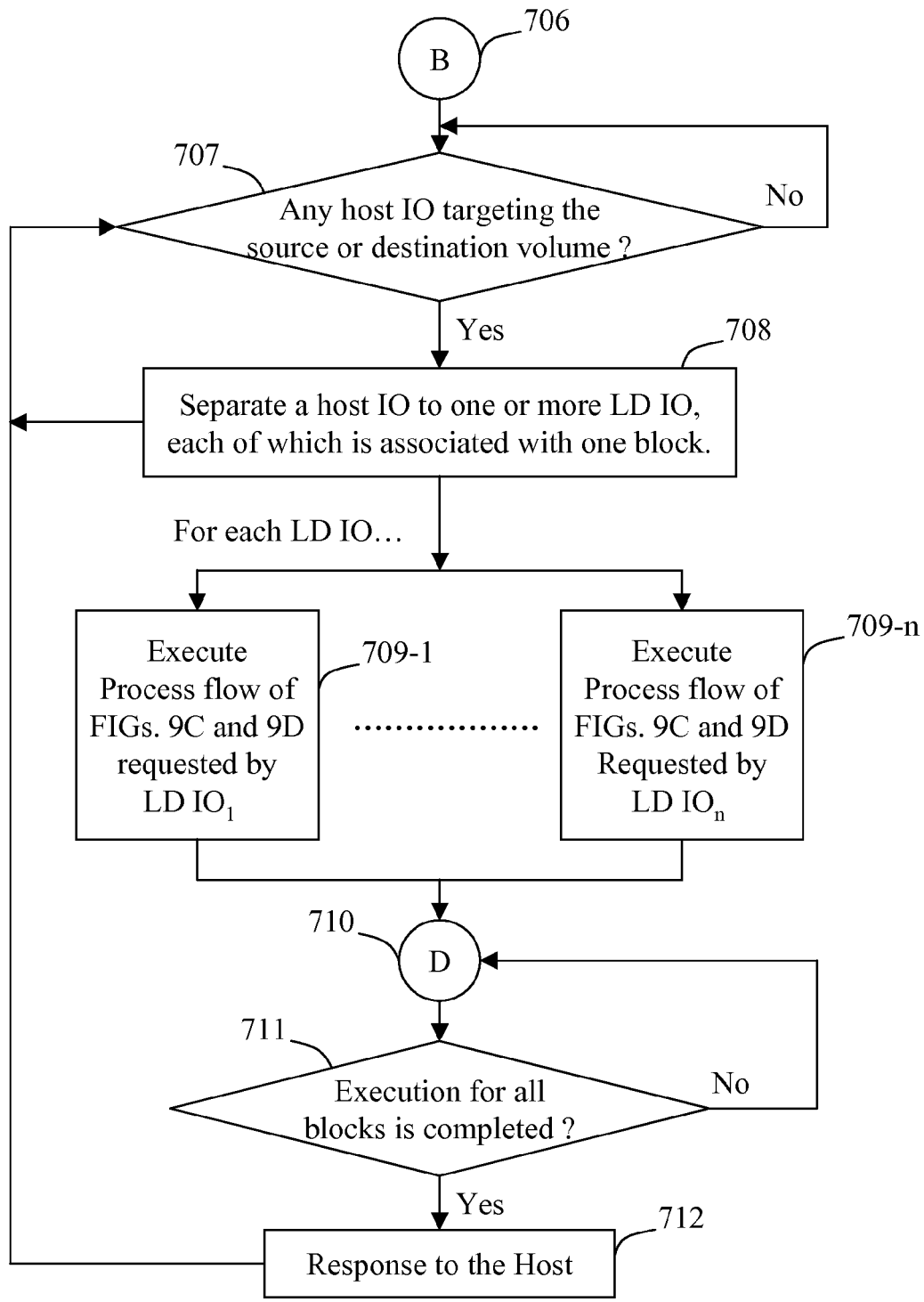

Referring to FIG. 9B, after entering the procedure from the join point B 706, step 707 is performed to inquire if there is any host IO request targeting the source volume or the destination volume. It is noted that: since, in the present process flow, the destination volume has been split off from the source volume, the two volumes can respectively be the target of the host IO request. If the determination result of step 707 is no, it is stayed at the inquiry state of step 707. If the determination result of step 707 is yes, step 708 is performed to parse the host IO request and separate it into one or more LD IO requests, each of which is targeting an associated data block of the source volume or the destination volume to be accessed. Thereafter, the process flow is divided into two directions: one goes to return to step 707 to continuously determine if there is any host IO request targeting the source volume or the destination volume; the other goes to simultaneously execute the process flows of FIG. 9C and FIG. 9D requested by each of the LD IO requests (step 709). For example, if there are n number of LD IO requests (LD $IO_1$ . . . LD $IO_n$) going to access n number of data blocks in the source volume or the destination volume, there will be n number of process flows (steps 709-1 . . . 709-$n$) of FIG. 9C and FIG. 9D triggered and executed simultaneously. Whenever the process flow associated with any one of the LD IO requests is completed, step 711 is performed to determine whether all of the process flows (steps 709-1 . . . 709-$n$) executed in parallel are completed or not. If the determination result of step 711 is no, the process flow returns to a join point D 710 and stays at the inquiry state of step 711. If the determination result of step 711 is yes, step 712 is performed to response to the host that the host IO request is completed, and then the process flow returns to step 707 to continuously determine if there is any other host IO request targeting the source volume or the destination volume.

It should be noted that, in FIG. 9B, as long as a host IO request appears to access data from the source volume or the destination volume, the host IO request is immediately processed by entering the process flow via step 707, no matter whether the previous host IO request(s) is(are) completed or not.

Figure 9C:
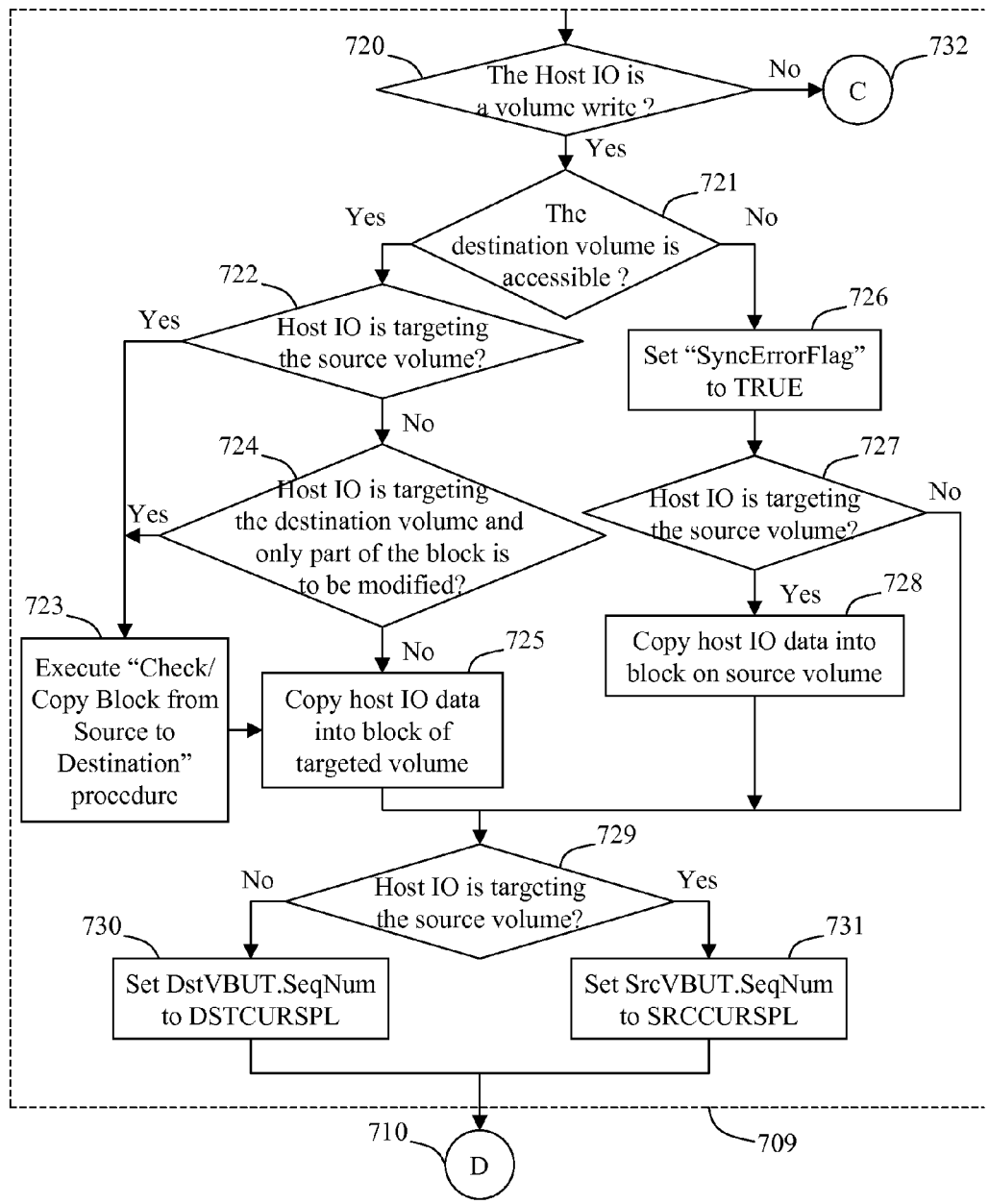
Figure 9D:
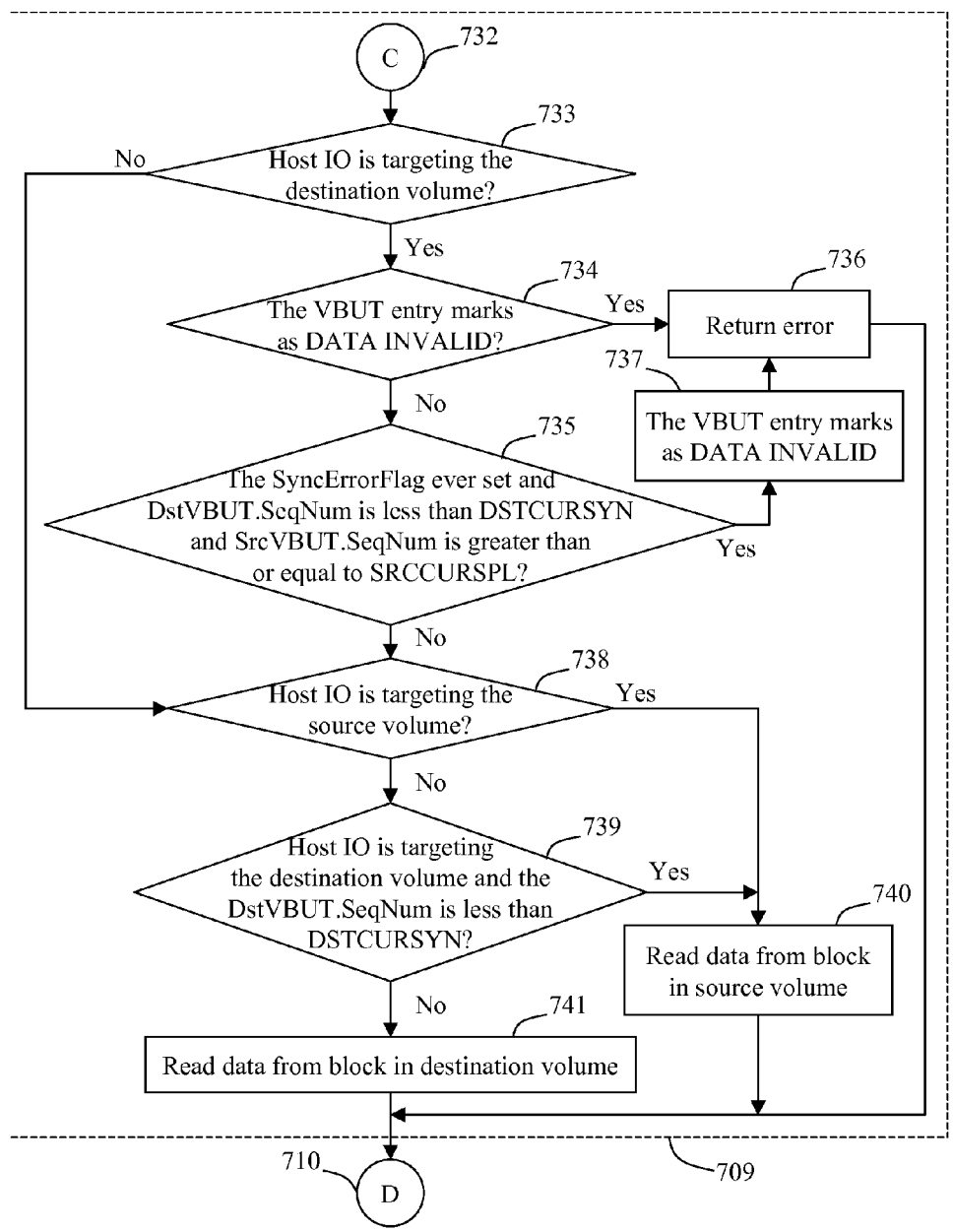

Referring to FIG. 9C and FIG. 9D, both together show a procedure for accessing a data block associated with each of the LD IO requests. The procedure shown in FIG. 9C and FIG. 9D is equivalent to a processing block of step 709 shown in FIG. 9B. At first, step 720 is performed to determine if the host IO request is intending to write data into the source volume or the destination volume. If the determination result of step 720 is no, it means that the host IO request is intending to read data, so the procedure enters the steps shown in FIG. 9D by a join point C 732 to perform related process flow of reading data. The related process flow shown in FIG. 9D will be described later. If the determination result of step 720 is yes, it means that the host IO request is intending to write data, so step 721 is performed to further determine if the destination volume is accessible. If the destination volume cannot be accessed at the time, a "synchronization error flag (SyncErrorFlag)" is set to "TRUE" (step 726). Then, step 727 is performed to further determine if the Host IO request is targeting the source volume for writing data thereto. If the determination result of step 727 is yes, the data to be written by the host IO request (Host IO data) are copied to the corresponding data block on the source volume (step 728). Going back to step 721, if the determination result of step 721 is yes, it means that the destination volume is accessible at the time, and then step 722 is performed to determine if the host IO request is targeting the source volume for writing data thereto. If the determination result of step 722 is yes, step 723 is performed to call and execute the procedure of "Check/Copy Block from Source to Destination", thereby checking and determining if it is necessary to copy the original data of the data block, which is currently processed, of the source volume to the corresponding data block of the destination volume beforehand. The details of the "Check/Copy Block from Source to Destination" procedure are already shown and described in FIG. 7 in the above. If the determination result of step 722 is no, step 724 is performed to further determine if the host IO request is targeting the destination volume for writing data and only a part of the data block needs to be modified. If the determination result of step 724 is yes, the process flow goes to step 723 as well. If the determination result of step 724 is no or after step 723 is completed, step 725 is performed to copy the data to be written by the host IO request (Host IO data) to the targeting data block in the source volume or the destination volume. After step 725 and step 728 are completed, step 729 is performed to further determine if the host IO request is targeting the source volume for writing data. If the determination result of step 729 is no, step 730 is performed to set the DstVBUT.SeqNum equal to the value of the third variable (DSTCURSPL), meaning that the data in the modified data block of the destination volume are updated in the event represented by the value of SRCCURSPL. If the determination result of step 729 is yes, step 731 is performed to set the SrcVBUT.SeqNum equal to the value of the first variable (DSTCURSPL), meaning that the data in the modified data block of the source volume are updated in the event represented by the value of SRCCURSPL. Thereafter, the process flow shown in FIG. 9C goes to the end and returns to FIG. 9B via the join point D 710, and then step 711 is entered to perform the determination.

If the determination result of step 720 is no, the process flow goes to FIG. 9D via the join point C 732 to read data. At first, step 733 is performed to determine if the host IO request is targeting the destination volume for reading data. If the determination result of step 733 is yes, step 734 is performed to further determine if the VBUT entry corresponding to the data block to be read is marked as "DATA INVALID". If the determination result of step 734 is yes, an error message is returned (step 736), and then the procedure of FIG. 9D goes to the end and returns to FIG. 9B via the join point D 710. If the determination result of step 734 is no, step 735 is performed to further determine if the synchronization error flag (SyncErrorFlag) of the destination volume is ever set to "TRUE", and the DstVBUT.SeqNum (standing for the sequence number of the VBUT entry, which is currently processed, of the destination volume) is less than the value of the second variable (DSTCURSYN), and the SrcVBUT.SeqNum (standing for the sequence number of the VBUT entry, which is currently processed, of the source volume) is greater than or equal to the first variable (SRCCURSPL). If the determination result of step 735 is yes, step 737 is performed to mark the VBUT entry corresponding to the data block to be written as "DATA INVALID". Then the process flow goes to step 736 as well to return an error message, and then the procedure of FIG. 9D goes to the end and returns to FIG. 9B via the join point D 710. If the determination result of step 735 is no, step 738 is performed to determine if the host IO request is targeting the source volume for reading data. If the determination result of step 738 is yes, step 740 is performed to read data from the data block in the source volume, and the procedure returns to FIG. 9B via the join point D 710. If the determination result of step 738 is no, step 739 is performed to further determine if the host IO request is targeting the destination volume for reading data and the DstVBUT.SeqNum (standing for the sequence number of the VBUT entry, which is currently processed, of the destination volume) is less than the value of the second variable (DSTCURSYN). If the determination result of step 739 is yes, it means that the data in the data block to be read is not synchronized with the corresponding data block in the source volume yet. Thus, the process flow turns to step 740 to read data from the corresponding data block in the source volume. If the determination result of step 739 is no, step 741 is performed to directly read data from the data block in the destination volume. Then the process flow goes to the end and returns to FIG. 9B via the join point D 710.

An actual example is taken below to explain how to achieve various volume replication methods, including volume copying and volume mirroring, using a unified architecture by administering the VLT and the VBUT in the present invention.

Figure 10A:
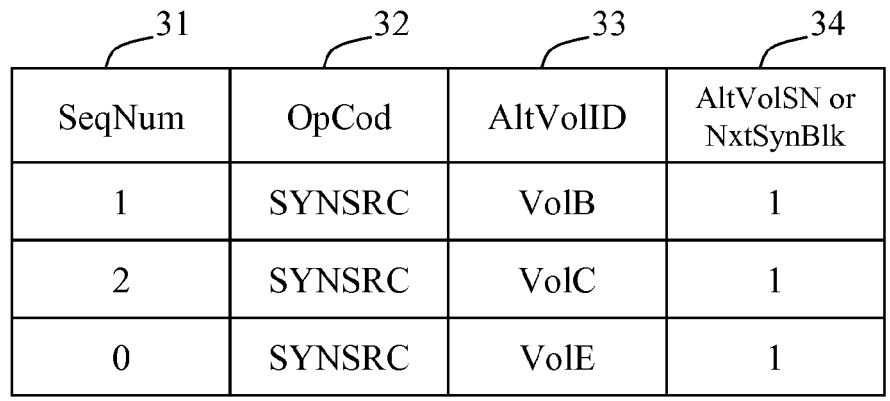
FIG. 10A to FIG. 10E depict actual examples of the volume log tables (VLTs) at a time point T according to the present invention.

Referring to FIG. 10A and FIG. 11A, both are schematic diagrams respectively showing the VLT and the VBUT of a volume A (VolA) at a time point T. As shown in FIG. 10A, it can be seen from its second field 32 and third field 33 that, at time point T, the VolA is the source volume of each of volumes B, C and E (VolB, VolC and VolE, respectively). Moreover, as shown in FIG. 10A, it can be seen from the sequence numbers (SeqNum) recorded in the first field 31 that the VolA has been split off from the volume B (VolB) and the volume C (VolC) (since their sequence numbers are not "0") but is not split off from the volume E (VolE) yet (since its sequence number is "0"). Moreover, as shown in FIG. 10A, it can be seen from the fourth field 34 that the corresponding sequence numbers of the volume A (VolA) stored in the VLTs of the volumes B, C and E (VolB, VolC, VolC) all are "1". As shown in FIG. 11A, the topmost row and the leftmost column are the indexes of the respective VBUT entries expressed in hexadecimal, and FIG. 11B to FIG. 11D, and FIG. 13A to FIG. 13D described below also have the same index expression. In FIG. 11A, with reference to FIG. 10A, the VBUT entries with the sequence number of "1" (such as those with the VBUT entry indexes of 0x01, 0x12, 0x25 and 0x3A) indicates that the data blocks corresponding thereto are the data blocks which have data changes due the access of the host IO request after the volume A (VolA) and the volume B (VolB) are spilt off from each other. Similarly, in FIG. 11A, the VBUT entries with the sequence number of "2" (such as those with the VBUT entry indexes of 0x04, 0x16, 0x28, 0x2E and 0x31) indicate that the data blocks corresponding thereto are the data blocks which have data changes due the access of the host IO request(s) after the volume A (VolA) and the volume C (VolC) are spilt off from each other. Other VBUT entries with a sequence number of "0" indicate the data blocks corresponding thereto are the ones which have no data changes until the time point T since the volume A (VolA) has the first split operation. It is noted that "0x" used in this disclosure stands for a hexadecimal value.

Figure 10B:
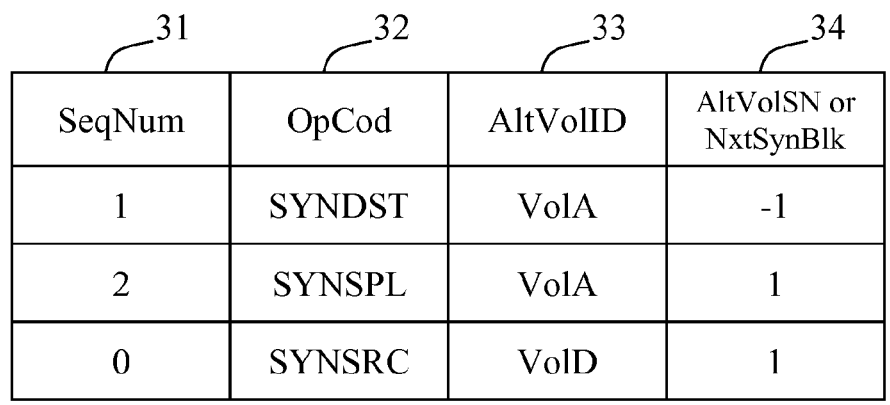

Referring to FIG. 10B and FIG. 11B, both are schematic diagrams respectively showing the VLT and the VBUT of the volume B (VolB) at the time point T. It can be seen from FIG. 10B that, at the time point T, the volume B (VolB) is the destination volume of the volume A (VolA) and has been split off therefrom, and meanwhile, the volume B (VolB) is the source volume of the volume D (VolD) but not split off yet. The value of "−1" shown in the fourth field 34 of the first VLT entry in FIG. 10B represents that the synchronization replication operation between the volume B (VolB) and the volume A (VolA) has been completed; the "SYNSPL" shown in the second field (OpCod) 32 of the second VLT entry represents that the volume B (VolB) has been split off from the volume A (VolA). If a volume acts as the destination volume, the operation codes (OpCod) stored in its second fields 32 often have "SYNDST" and "SYNSPL" shown in a pair. In FIG. 11B, with reference to FIG. 10B, the VBUT entries with the sequence number of "1" indicate that the data blocks corresponding thereto are the data blocks which have been synchronized after the establishment of the synchronization relationship between the volume B (VolB) and the volume A (VolA). Further, the VBUT entries with the sequence number of "2" indicate that the data blocks corresponding thereto are the data blocks which have data changes due the access of the host IO request(s) after the volume B (VolB) is split off from the volume A (VolA).

Figure 10C:
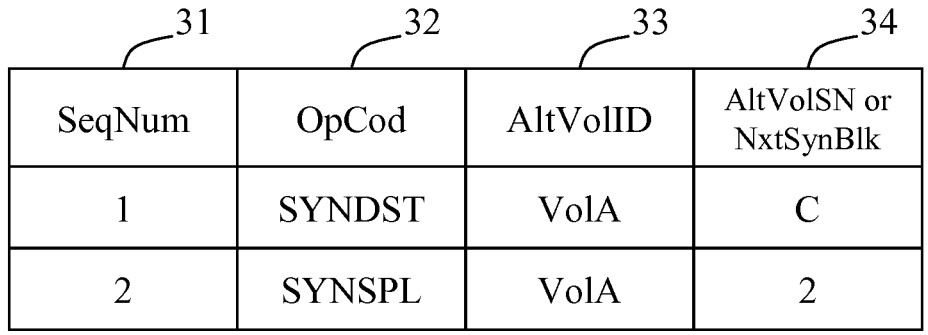

Referring to FIG. 10C and FIG. 11C, both are schematic diagrams respectively showing a VLT and a VBUT of the volume C (VolC) at the time point T. It can be seen from FIG. 10C that, at the time point T, the volume C (VolC) is the destination volume of the volume A (VolA), and the two volumes have been split off from each other but do not complete the synchronization replication operation yet. In FIG. 10C, the "C" shown in the fourth field 34 of the first VLT entry indicates "NxtSynBlk" representing that the index of the next data block of the volume C (VolC) to be synchronously replicated is "0x0C". Since the value stored in this field (NxtSynBlk) is not "−1", it can be seen that the volume C (VolC) has not been completely synchronized with the volume A (VolA) yet. The value of "2" shown in the fourth field 34 of the second VLT entry indicates "AltVolSN" representing that the volume C (VolC) has been split off from the volume A (VolA), and the corresponding sequence number of the VLT entry of the volume A (VolA) is "2". In FIG. 11C, with reference to FIG. 10C, the VBUT entries with the sequence number of "1" indicate that the data blocks corresponding thereto are the data blocks which have been synchronized after the establishment of the synchronization relationship between the volume C (VolC) and the volume A (VolA). Further, the VBUT entries with the sequence number of "2" indicate that the data blocks corresponding thereto are the data blocks which have data changes due the access of the host Io request(s) after the volume C (VolC) is split off from the volume A (VolA). Since the initial value of the sequence number of each VBUT entry is set to "0" by the initialization procedure and the volume C (VolC) merely acts as the destination volume of the volume A (VolA) at the time point T, the VBUT entries with the sequence number of "0" indicate that the corresponding data blocks in the volume C (VolC) have not been synchronized yet or have no data changes due to any host IO request.

Figure 10D:
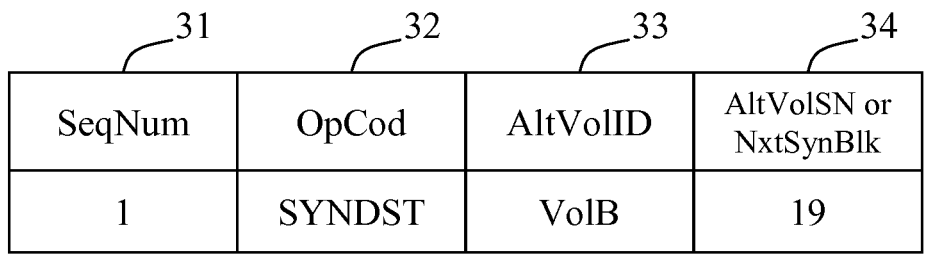

Referring to FIG. 10D and FIG. 11D, both are schematic diagrams respectively showing the VLT and the VBUT of the volume D (VolD) at the time point T. There is only one VLT entry shown in FIG. 10D. It can be seen from the entry that the volume D (VolD) is the destination volume of the volume B (VolB), and the two volumes are not split off from each other yet, and the index of the next data block of the volume D (VolD) to be synchronized is "0x19". Referring to FIG. 11D, it is obvious that the sequence numbers of the VBUT entries before the index of "0x19" are all equal to "1", and those thereafter are all equal to "0", meaning that the volume D (VolD) is only involved with the synchronous replication operation with the volume B (VolB). Since the volume D (VolD) is not split off from the volume B (VolB) yet, the host cannot see the volume D (VolD), so that there is no host IO request targeting the volume D (VolD) for data access.

Figure 10E:
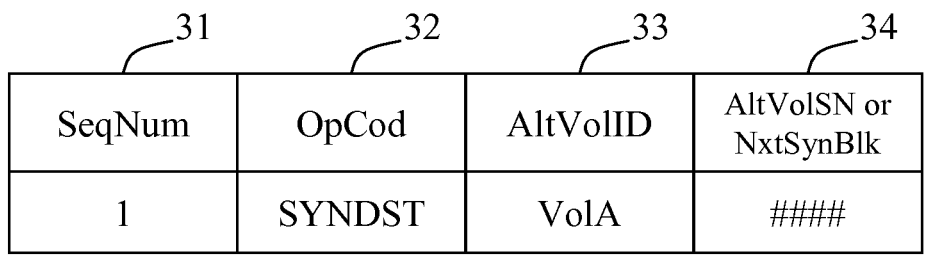
Figure 12A:
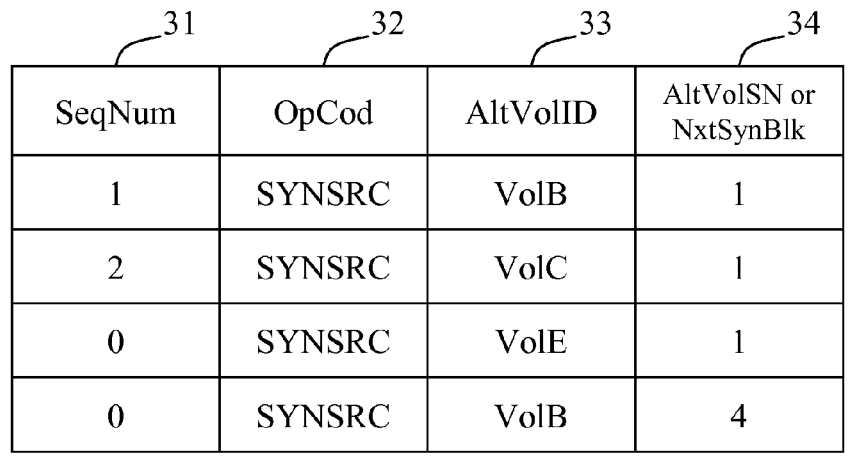
Figure 12B:
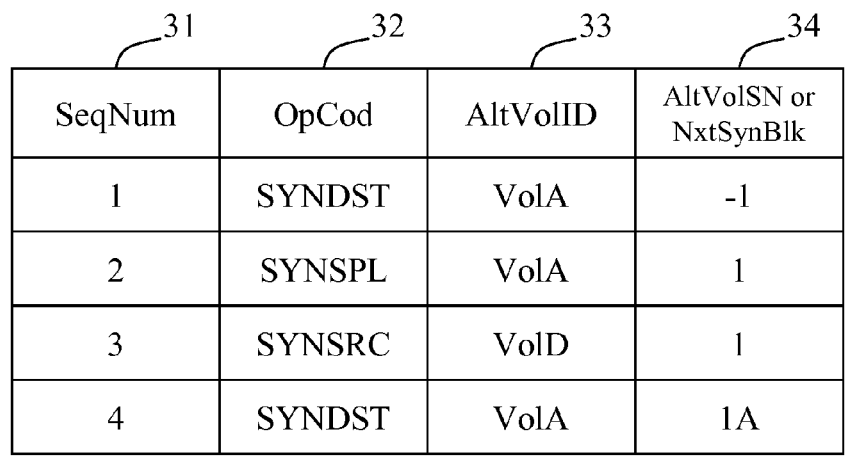

Referring to FIG. 10E, it is a schematic diagram showing a VLT of the volume E (VolE) at the time point T. There is only one VLT entry shown in FIG. 10E. It can be seen from the entry that the volume E (VolE) is the destination volume of the volume A (VolA), and the two volumes are not split off from each other yet, and the index of the next data block of the volume E (VolE) to be synchronized is "0x####".

From the summarization of the information expressed in FIG. 10A to FIG. 10E, it can be seen that, at the time point T, the volume A (VolA) is the source volume of each of the volumes B, C and E (VolB, VolC, VolE), and the volume B is the source volume of the volume D (VolD), and 1. the volume B (VolB) and the volume A (VolA) have been split off from each other and have completed the synchronization replication operation therebetween;

2. the volume C (VolC) and the volume A (VolA) have been split from each other but have not completed the synchronization replication operation yet;

3. the volume D (VolD) and the volume B (VolB) have not been split from each other and also have not completed the synchronization replication operation yet; and 4. the volume E (VolE) and the volume A (VolA) have not been split from each other and also have not completed the synchronization replication operation yet.

After a period of time t, that is, at a time point T+t, the respective VLTs of the volumes A, B, C, D and E (VolA, VolB, VolC, VolD, VolE) are as shown in FIG. 12A to FIG. 12E, and the respective VBUTs of the volumes A, B, C and D (VolA, VolB, VolC, VolD) are as shown in FIG. 13A to FIG. 13D. These figures, similar to FIG. 10A to FIG. 10E and FIG. 11A to FIG. 11D, record the information in accordance with the aforementioned principles and methods. The detailed contents of the respective figures can be interpreted similarly by following the description of FIG.

10A to FIG. 10E and FIG. 11A to FIG. 11D, and thus are not described in detail herein again. In sum, FIG. 12A to FIG. 12E and FIG. 13A to FIG. 13D represent the following points.

1. A resync operation is activated between the volume A (VolA) and the volume B (VolB), and the two volumes have not split off from each other and have not completed the synchronization operation yet;

2. the volume D (VolD) and the volume B (VolB) have split off from each other and have completed the synchronization operation;

3. the state between the volume C (VolC) and the volume A (VolA) still stays at "split but the synchronization operation not completed yet"; however, the "NxtSynBlk" has progressed from "0x0C" to "0x27"; and 4. the state between the volume E (VolE) and the volume A (VolA) still stays at "unsplit and the synchronization operation not completed yet".

It can be seen from the above description that each volume provided by the present invention has its exclusive VLT and VBUT, and with the help of the cross operations between the VLT and the VBUT, various replication methods including volume copying and volume mirroring can be enabled under a unified architecture. Moreover, for each volume, various types and many numbers of replication relationships with other volumes can be handled merely by administering its two exclusive tables of VLT and VBUT. Hence, the present invention can advantageously simplify the architecture for synchronization replication operation and reduce the burdens of administrating tables, thereby making the operation of a storage system more efficient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for performing volume replication operation, comprising:
   forming a first mirroring pair composed of a first volume and a second volume;
   providing at least one first volume log table (VLT) and a first volume block update table (VBUT) for the first volume, and providing at least one second VLT and a second VBUT for the second volume;
   administering the at least one first VLT and the first VBUT and the at least one second VLT and the second VBUT, wherein the at least one first VLT and the at least one second VLT are used for recording synchronization state information after the first volume and the second volume forms the first mirroring pair for a first synchronization operation, and the first VBUT and second VBUT are used for recording updated state information of each data block of the first volume and the second volume, respectively;
   forming a second mirroring pair composed of the first volume and a third volume;
   providing at least one third VLT and a third VBUT for the third volume; and
   administering the at least one first VLT and the first VBUT and the at least one third VLT and the third VBUT, wherein the at least one first VLT and the at least one third VLT are used for recording synchronization state information after the first volume and the third volume forms the second mirroring pair for a second synchronization operation, and the first VBUT and the third VBUT are used for recording updated state information of each data block of the first volume and the third volume, respectively;
   wherein the first VBUT, the second VBUT, and the third VBUT have a plurality of entries each of them used for recording a sequence number to represent the updated state information of each data block of the first volume, the second volume, and the third volume, respectively.

2. The method of claim 1, wherein one of two replication operations composed of volume copying and volume mirroring is performed between the first volume and the second volume of the first mirroring pair.

3. The method of claim 2, wherein one of two replication operations composed of volume copying and volume mirroring is performed between the first volume and the third volume of the second mirroring pair.

4. The method of claim 1, wherein the first VBUT, administered by the first volume, is used for recording updated state information of each data block of the first volume when the first mirroring pair composed of the first volume and the second volume is formed, and the same first VBUT, also administered by the first volume, is used for recording updated state information of each data block of the first volume when the second mirroring pair composed of the first volume and the third volume is formed.

5. The method of claim 4, wherein the at least one first VLT comprises a first-to-second VLT, administered by the first volume, for recording synchronization state information of the first mirroring pair composed of the first volume and the second volume.

6. The method of claim 5, wherein the at least one first VLT comprises a first-to-third VLT, administered by the first volume, for recording synchronization state information of the second mirroring pair composed of the first volume and the third volume.

7. The method of claim 5, wherein the first-to-second VLT is used for recording synchronization state information of the second mirroring pair composed of the first volume and the third volume.

8. The method of claim 5, further comprising:
   allocating a first entry in the first-to-second VLT when the first mirroring pair composed of a first volume and a second volume is formed; and
   initializing a plurality of fields of the first entry comprising: setting a sequence number (SeqNum) defined in a first field of the first entry to an first initial setting value, setting an operation code (OpCod) defined in a second field of the first entry to an operation code (OpCod) representing a state of the first volume, and setting an alternative volume sequence number (AltVolSN) or a next sync block index (NxtSynBlk) defined in a forth field of the first entry, wherein the alternative volume sequence number (AltVolSN) is one representing an entry in one of the at least one second VLT and the first next sync block index (NxtSynBlk) is one representing a next data block, starting from a starting address, to be synchronized of the first volume.

9. The method of claim 8, further comprising: setting a third field of the first entry of the first-to-second VLT to represent the identity of the second volume.

10. The method of claim 8, further comprising:
    providing a first-to-third VLT in the at least one first VLT, said first-to-third VLT being administered by the first volume, for recording synchronization state information of the second mirroring pair composed of the first volume and the third volume;

allocating a first entry in the first-to-third VLT of the first volume when the second mirroring pair composed of a first volume and a third volume is formed; and initializing a plurality of fields of the first entry comprising: setting a sequence number (SeqNum) defined in a first field of the first entry to an first initial setting value, setting an operation code (OpCod) defined in a second field of the first entry to an operation code (OpCod) representing a state of the first volume, and setting an alternative volume sequence number (AltVolSN) or a next sync block index (NxtSynBlk) defined in a forth field of the first entry, wherein the alternative volume sequence number (AltVolSN) is one representing an entry in one of the at least one third VLT and the first next sync block index (NxtSynBlk) is one representing a next data block, starting from a starting address, to be synchronized of the first volume.

11. The method of claim 10, further comprising: setting a third field of the first entry of the first-to-third VLT to represent the identity of the third volume.

12. The method of claim 1, wherein the first volume and the second volume of the first mirroring pair are respectively a source volume and a destination volume in the first mirroring pair.

13. The method of claim 12, further comprising:
allocating a first entry in the at least one first VLT of the source volume, and initializing a plurality of fields of the first entry comprising: setting a sequence number (SeqNum) defined in a first field of the first entry to an initial setting value; and setting an operation code (OpCod) defined in a second field of the first entry to an operation code representing a state of the source volume; wherein the initial setting value recorded in the first field of the first entry is further assigned to a first variable;

allocating a second entry in the at least one second VLT of the destination volume, and initializing a plurality of fields of the second entry comprising: setting an OpCod defined in a second field of the second entry to an operation code representing a state of the destination volume;

adding an increment to a value of a master sequence number variable of the destination volume, and copying the value of the master sequence number variable of the destination volume into a first field of the second entry in the at least one second VLT of the destination volume as a SeqNum defined therein, and into a fourth field of the first entry in the at least one first VLT of the source volume as an alternative volume's sequence number (AltVolSN) defined therein, wherein the value of the master sequence number variable of the destination volume is further assigned to a second variable;

setting a fourth field of the second entry in the at least one second VLT of the destination volume as a starting address, wherein the fourth field of the second entry is used for recording an index of a next data block to be synchronously replicated (DstVLT.NxtSynBlk); and performing a background copy (Background Copy of Source to Destination) procedure started from the starting address for copying the source volume to the destination volume.

14. The method of claim 13, further comprising: determining if there is a host IO (Input/Output) request targeting the source volume or the destination volume for data access.

15. The method of claim 12, wherein a split event occurs during the synchronization operation or when or after the synchronization operation is completed, the method comprising:

allocating a first entry in the at least one first VLT of the source volume, and initializing a plurality of fields of the first entry comprising: setting a sequence number (SeqNum) defined in a first field of the first entry to an initial setting value; and setting an operation code (OpCod) defined in a second field of the first entry to an operation code representing a state of the source volume;

allocating a second entry in the at least one second VLT of the destination volume, and initializing a plurality of fields of the second entry comprising: setting an OpCod defined in a second field of the second entry to an operation code representing a state of the destination volume;

adding an increment to a value of a master sequence number variable of the destination volume, and copying the value of the master sequence number variable of the destination volume into a first field of the second entry in the at least one second VLT of the destination volume as a SeqNum defined therein, and into a fourth field of the first entry in the at least one first VLT of the source volume as an alternative volume's sequence number (AltVolSN) defined therein, wherein the value of the master sequence number variable of the destination volume is further assigned to a second variable;

setting a fourth field of the second entry in the at least one second VLT of the destination volume as a starting address, wherein the fourth field of the second entry is used for recording an index of a next data block to be synchronously replicated (DstVLT.NxtSynBlk);

adding an increment to a value of a master sequence number variable of the source volume, and copying the value of the master sequence number variable of the source volume into a first field of the first entry in the at least one first VLT of the source volume as a SeqNum defined therein, wherein the value of the master sequence number variable of the source volume is further assigned to a first variable;

allocating a third entry in the at least one second VLT of the destination volume, and initializing a plurality of fields of the third entry comprising: setting an OpCod defined in a second field of the third entry to an operation code representing a split state;

adding an increment to the value of the master sequence number variable of the destination volume again, and copying the value of the master sequence number variable of the destination volume into a first field of the third entry in the at least one second VLT of the destination volume as a SeqNum defined therein; and determining if the synchronization operation between the source volume and the destination volume is completed.

16. The method of claim 15, further comprising: performing a background copy procedure for copying the source volume to the destination volume.

17. The method of claim 15, further comprising: determining if there is a host IO (Input/Output) request targeting the source volume or the destination volume for data access.

18. The method of claim 1, further comprising:
performing a first background copy procedure for copying data blocks of the first volume to the second volume in the first synchronization operation;

detecting whether a host IO request from a host is targeting the first volume; and processing one or more logical drive IO requests associated the host IO when a host IO request targeting the first volume is detected.

19. The method of claim 18, wherein the step of processing one or more logical drive IO requests further comprising:

when the host IO request is a write request targeting the first volume and it is determined that data stored in the data blocks of the first volume that are associated with the host IO request have been copied to the second volume due to the first background copy procedure, writing data of the host IO request into both the first volume and the second volume.

20. The method of claim 19, wherein the determination that data stored in the data blocks of the first volume that are associated with the host IO request have been copied to the second volume due to the first background copy procedure is determinate by using the second VBUT.

21. The method of claim 18, wherein the step of processing one or more logical drive IO requests further comprising:

when the host IO request is a write request targeting the first volume and it is determined that data stored in the data blocks of the first volume that are associated with the host IO request have not been copied to the second volume due to the first background copy procedure, writing data of the host IO request into the first volume.

22. The method of claim 21, wherein the determination that data stored in the data blocks of the first volume that are associated with the host IO request have not been copied to the second volume due to the first background copy procedure is performed by using the second VBUT.

23. The method of claim 1, further comprising:

performing a second background copy procedure for copying data blocks of the first volume to the third volume in the second synchronization operation, wherein a split event occurs during the second synchronization operation or when or after the second synchronization operation is completed; and detecting whether a host IO request from a host is the first volume; and processing one or more logical drive IO requests associated the host IO when a host IO request targeting the first volume is detected.

24. The method of claim 23, wherein the step of processing one or more logical drive IO requests further comprising:

after a split event occurs, when the host IO request is a write request targeting the first volume and it is determined that data stored in the data blocks of the first volume that are associated with the host IO request have been copied to the third volume due to the second background copy procedure, writing data of the host IO request into the first volume.

25. The method of claim 24, wherein the determination that data stored in the data blocks of the first volume that are associated with the host IO request have been copied to the third volume due to the second background copy procedure is determined by using the third VBUT.

26. The method of claim 23, wherein the step of processing one or more logical drive IO requests further comprising:

after a split event occurs, when the host IO request is a write request targeting the first volume and it is determined that data stored in the data blocks of the first volume that are associated with the host IO request have not been copied to the third volume due to the second background copy procedure, determining whether data stored in the data blocks of the first volume have been replicated to the third volume after the split event such that the corresponding data blocks of the first volume and the third volume have been synchronized, and if it is determined that the data blocks of the first volume have not been replicated to the third volume after the split event, first copying the data stored in the data blocks of the first volume to the third volume, and then writing data of the host IO request into the first volume, and if it is determined that the data blocks of the first volume have been replicated to the third volume after the split event, writing data of the host IO request into the first volume.

27. The method of claim 26, wherein the determination that data stored in the data blocks of the first volume that are associated with the host IO request have not been copied to the third volume due to the second background copy procedure is determined by using the third VBUT.

28. The method of claim 26, wherein the step of the determining whether data stored in the data blocks of the first volume have been replicated to the third volume after the split event such that the corresponding data blocks of the first volume and the third volume have been synchronized is determined by using the third VBUT.

* * * * *